US012649975B2

(12) United States Patent
    Jo (Zee) et al.

(10) Patent No.: US 12,649,975 B2
(45) Date of Patent: Jun. 9, 2026

(54) HYPOCHLOROUS ACID WATER PREPARATION AGENT, HYPOCHLOROUS ACID WATER PREPARATION PACKAGE, AND HYPOCHLOROUS ACID WATER PRODUCTION METHOD

(71) Applicant: CROWN COMPANY LIMITED, Kanagawa (JP)

(72) Inventors: Min (Kenneth Min) Jo (Zee), Kanagawa (JP); Natsuko Jo (Zee), Kanagawa (JP); Mitsutaka (Christopher) Jo (Zee), Kanagawa (JP)

(73) Assignee: CROWN COMPANY LIMITED, Kanagawa (JP)

( * ) Notice: Subject to any disclaimer, the term of this patent is extended or adjusted under 35 U.S.C. 154(b) by 732 days.

(21) Appl. No.: 17/994,218

(22) Filed: Nov. 25, 2022

(65) Prior Publication Data

US 2023/0090798 A1     Mar. 23, 2023

Related U.S. Application Data

(63) Continuation of application No. PCT/JP2022/015149, filed on Mar. 28, 2022.

(30) Foreign Application Priority Data

Apr. 22, 2021     (JP) ................................. 2021-072570
Jun. 14, 2021     (JP) ................................. 2021-098963

(51) Int. Cl.
    *C25B 9/17*          (2021.01)
    *C02F 1/461*         (2023.01)
    *C25B 1/26*          (2006.01)

(52) U.S. Cl.
    CPC ................ *C25B 9/17* (2021.01); *C02F 1/461* (2013.01); *C25B 1/26* (2013.01)

(58) Field of Classification Search
    CPC .............. C25B 1/26; C25B 9/17; C02F 1/461
    See application file for complete search history.

(56) References Cited

FOREIGN PATENT DOCUMENTS

| | | |
|---|---|---|
| CN | 1854081 A | 11/2006 |
| JP | H07-059846 A | 3/1995 |
| JP | H11-151256 A | 6/1999 |
| JP | 2000-263047 A | 9/2000 |

(Continued)

OTHER PUBLICATIONS

Office Action issued in Chinese Patent Application No. 202280004591.2, mailed on Jun. 29, 2023, with English Translation (17 pages).

(Continued)

*Primary Examiner* — Ciel P Contreras
(74) *Attorney, Agent, or Firm* — Nakanishi IP Associates, LLC

(57)          ABSTRACT

A hypochlorous acid water preparation agent merely contains elements without concern for the human body, allows hypochlorous acid water to be prepared without effort, and can be stored or transported easily. The hypochlorous acid water preparation agent is an additive for preparing hypochlorous acid water by electrolyzing an electrolytic solution obtained by dissolving an electrolyte in a specified amount of water. The additive consists of sodium chloride, sodium diacetate, and optional sodium hydrogencarbonate. The additive is in powder form, particle form, granule form, or tablet form.

15 Claims, 11 Drawing Sheets

(56)     References Cited

FOREIGN PATENT DOCUMENTS

| | | | |
|---|---|---|---|
| JP | 2003-126856 | A | 5/2003 |
| JP | 2011-056377 | A | 3/2011 |
| JP | 3188166 | U | 1/2014 |
| JP | 2017-206449 | A | 11/2017 |
| JP | 2019-156784 | A | 9/2019 |
| JP | 2020-007806 | A | 1/2020 |
| KR | 20130049031 | A | 5/2013 |
| WO | 2008-099471 | A1 | 8/2008 |
| WO | 2014/080847 | A1 | 5/2014 |

OTHER PUBLICATIONS

International Search Report issued in PCT/JP2022/015149 mailed on May 24, 2022 with English Translation (5 pages).
Written Opinion of International Searching Authority issued in PCT/JP2022/015149 mailed on May 24, 2022 with English Translation (5 pages).
Office Action issued in Japanese Patent Application No. 2021-098963 dated Oct. 1, 2021, with English Translation (6 pages).

FIG. 3

FIG. 4A                              FIG. 4B
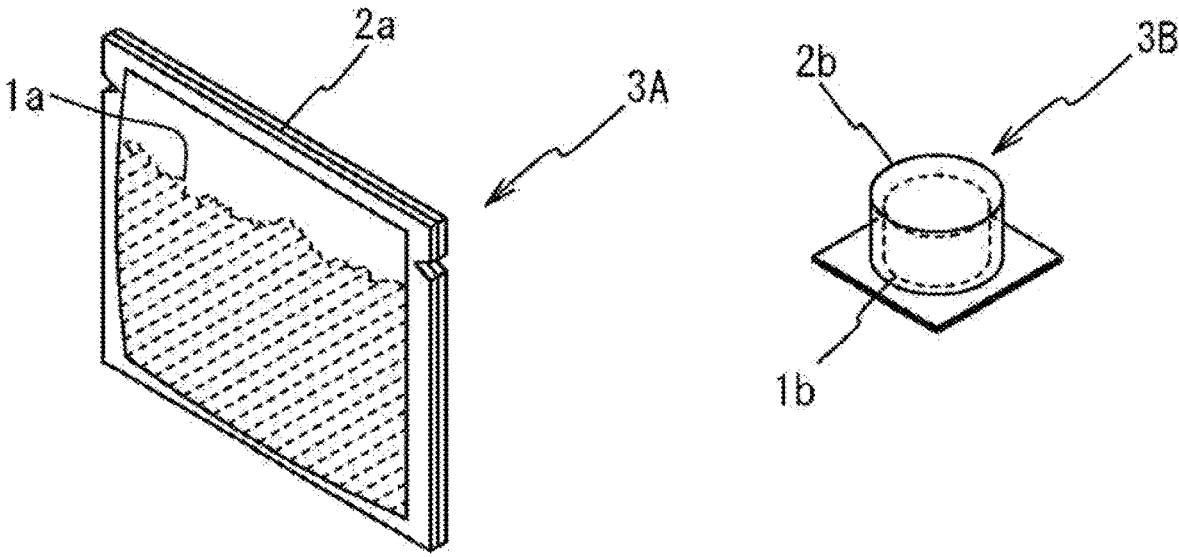

FIG. 7

HYPOCHLOROUS ACID WATER PREPARATION AGENT, HYPOCHLOROUS ACID WATER PREPARATION PACKAGE, AND HYPOCHLOROUS ACID WATER PRODUCTION METHOD

CROSS-REFERENCE TO RELATED APPLICATIONS

This application is a continuation application of International Patent Application No. PCT/JP2022/15149 filed on Mar. 28, 2022, which claims priority to Japanese Patent Application No. 2021-072570 filed on Apr. 22, 2021 and Japanese Patent Application No. 2021-098963 filed on Jun. 14, 2021, the entire contents of which are incorporated by reference.

BACKGROUND OF INVENTION

Field of the Invention

The present invention relates to a hypochlorous acid water preparation agent that facilitates preparation of hypochlorous acid water that is harmless to the human body, has sterilizing and deodorizing effects, and can improve the human living environment, and to a hypochlorous acid water preparation package and a hypochlorous acid water production method.

Background Art

Hypochlorous acid water is known to be harmless to the human body.

Thus, hypochlorous acid water is prepared by, for example, electrolyzing an electrolytic solution such as water containing electrolyte salt being dissolved and is used for sterilization or deodorization. More specifically, articles and food are typically immersed in such hypochlorous acid water or a mist of such water is sprayed on these objects for sterilization or deodorization.

In more detail, vegetables may be immersed in hypochlorous acid water to reduce propagation of unwanted bacteria that may decay the vegetables. In hospitals, care facilities, or houses, a mist of hypochlorous acid water may be sprayed to kill or inactivate infectious pathogenic bacteria and viruses.

Hypochlorous acid water also has the deodorizing effect. Thus, atomized hypochlorous acid water can be sprayed to remove the smell of pets or cigarettes or prevent an offensive odor from being produced in a kitchen or a bathroom.

However, typical devices for generating hypochlorous acid water are large and expensive. Few such devices are available as personal appliances that can be easily used in homes.

In response to this, simplified hypochlorous acid water generators for home or personal use have been invented or conceived.

Patent Literature 1 describes a technique under the title HYPOCHLOROUS ACID AQUEOUS SOLUTION GENERATOR AND AQUEOUS SOLUTION CONTAINER FOR THE SAME directed to a hypochlorous acid aqueous solution generator and an aqueous solution container used for the generator. The generator improves life environments using the properties of a hypochlorous acid aqueous solution being harmless to the human body, as well as using its sterilizing and deodorizing effects.

The hypochlorous acid aqueous solution generator described in Patent Literature 1, which is described using the same reference numerals as in FIG. 2 in the literature, uses a container being an aqueous solution container 20 used in a hypochlorous acid aqueous solution generator 10 for mixing water and salt together in the container to form a salt solution, electrolyzes the salt solution, and adjusts the resultant electrolyzed water to form a specific hypochlorous acid aqueous solution. The container is electrically connected to an electrical contact on a container mount 50 for the hypochlorous acid aqueous solution generator 10. The aqueous solution container 20 includes, on its bottom, an electrode holder 24 holding a pair of electrolysis electrode plates 26 electrically connected to the electrical contact on the container mount 50. The maximum diameter of the electrode holder 24 is smaller than the maximum diameter of the inlet of the aqueous solution container 20.

The technique described in Patent Literature 1 provides a hypochlorous acid aqueous solution generator for home or personal use. The generator with the technique described in Patent Literature 1 is small and inexpensive and reduces the production cost. Moreover, the technique described in Patent Literature 1 provides a hypochlorous acid aqueous solution generator and an aqueous solution container used for the generator that can be used without concern by any person to generate a hypochlorous acid aqueous solution at an intended location.

Patent Literature 2 describes an invention entitled DENTURE WASHING IMPLEMENT directed to a denture washer that generates electrolyzed water for washing dentures or glasses.

The denture washing implement described in Patent Literature 2, which is described using the same reference numerals as in FIG. 1 in the literature, includes a container 2 fed with water, multiple electrolytic electrodes 3 that pass a current through the water to generate electrolyzed water, and a power supply 4 that applies a voltage to the electrolytic electrodes 3.

The technique described in Patent Literature 2 provides a denture washing implement that can easily wash a denture in a home without using a pharmaceutical agent such as an alkaline peroxide.

CITATION LIST

Patent Literature

Patent Literature 1: Japanese Registered Utility Model No. 3188166
Patent Literature 2: Japanese Unexamined Patent Application Publication No. 11-151256
The technique described in Patent Literature 1 can produce a hypochlorous acid aqueous solution with a pH value of about 5.8 by adding 5 g of salt to 0.5 L of tap water in the aqueous solution container for the hypochlorous acid aqueous solution generator to prepare a salt solution, then passing a 100 mA current through the salt solution for seven hours to produce electrolyzed water, diluting the electrolyzed water with 1 L of tap water, and neutralizing the diluted solution with 0.5 L of carbonated water. However, the technique described in Patent Literature 1 uses seven hours or more to produce about 2 L of hypochlorous acid aqueous solution.

Thus, the technique described in Patent Literature 1 takes time and effort to produce a hypochlorous acid aqueous solution.

Additionally, the technique in Patent Literature 1 involves correct measurement of tap water and salt performed by the user for preparing a salt solution, tap water used as dilution water, and carbonated water used as a neutralizer each time the hypochlorous acid aqueous solution generator is used. When the measurement is incorrect, the resultant hypochlorous acid aqueous solution cannot have an intended concentration of free residual chlorine or an intended pH value. More specifically, the technique in Patent Literature 1 cannot produce an intended hypochlorous acid aqueous solution when the user skips the dilution or neutralization process.

The technique described in Patent Literature 1 causes complicated handling for users.

Paragraph 0016 of Patent Literature 2 states "The pH adjustor is used to adjust the pH of the water in the container 2 depending on the object to be washed. For example, a combination of acetic acid and sodium acetate is added to the water in the container 2 to form a buffer solution."

Thus, unlike the technique described in Patent Literature 1, Patent Literature 2 eliminates the use of carbonated water mixed to adjust the pH of the generated electrolytic solution. Thus, Patent Literature 2 allows the pH of the electrolyzed solution to be adjusted more easily than Patent Literature 1.

However, in Patent Literature 2, NaCl used as an electrolyte, and acetic acid and sodium acetate added to the electrolytic solution as a buffer are stored in an additive tank 6 (refer to FIG. 3) and fed to the container 2 from the additive tank 6 through a tube 29. More specifically, the technique described in Patent Literature 2 feeds the electrolyte and the buffer as liquid, or an aqueous solution.

In the implement described in Patent Literature 2, the solvent such as water may evaporate or decrease gradually from the additive (liquid) in the additive tank 6. In this case, the concentration of the additive cannot be maintained appropriately. Moreover, the additive may partially oxidize or degenerate in the additive tank 6. In this case, the pH of the electrolyzed solution cannot be adjusted appropriately.

More specifically, the implement in Patent Literature 2 cannot easily manage the electrolyzed solution with the pH maintained with high accuracy.

One or more aspects of the present invention are directed to a hypochlorous acid water preparation agent merely containing elements without concern for the human body, allowing hypochlorous acid water to be prepared without effort, and stored or transported easily, and also a hypochlorous acid water preparation package and a hypochlorous acid water production method.

SUMMARY OF INVENTION

A hypochlorous acid water preparation agent according to a first aspect of the present invention is an additive for preparing hypochlorous acid water by electrolyzing an electrolytic solution obtained by dissolving an electrolyte in a specified amount of water. The additive consists of sodium chloride, sodium diacetate, and optional sodium hydrogencarbonate (baking soda). The additive is in powder form, particle form, granule form, or tablet form.

The sodium chloride in the first aspect of the invention provides chlorine to be hypochlorite ions in the electrolyzed solution.

The sodium diacetate in the first aspect of the invention also reduces the pH value of the electrolyzed solution. More specifically, although an electrolyzed solution obtained by electrolyzing a salt solution has a pH value of about 9, an electrolyzed solution obtained by electrolyzing a salt solution containing dissolved sodium diacetate has a pH value lower than 9. Thus, the sodium diacetate in the first aspect raises the acidity of the electrolyzed solution. The agent according to the first aspect thus increases the percentage of hypochlorous acid in the electrolyzed solution compared with an agent free of sodium diacetate.

The agent according to the first aspect of the invention may contain sodium hydrogencarbonate as appropriate.

With the agent according to the first aspect of the invention containing sodium hydrogencarbonate, the sodium hydrogencarbonate reacts with acetic acid produced from the dissociation of the sodium diacetate in water to generate carbon dioxide.

Thus, with the agent according to the first aspect of the invention particularly in the form of a tablet containing sodium hydrogencarbonate, when the tablet is placed into water, carbon dioxide is generated and breaks the tablet smoothly.

Thus, the agent according to the first aspect of the invention particularly in tablet form can contain sodium hydrogencarbonate to shorten the time taken to dissolve the constituents in water.

Additionally, as described above, the sodium diacetate contained in the agent according to the first aspect of the invention raises the acidity of the electrolyzed solution. In contrast, the alkalinity of the electrolytic solution obtained by dissolving the agent according to the first aspect increases in proportion with the amount of charge added to the aqueous solution, irrespective of whether sodium hydrogencarbonate is contained.

With the agent according to the first aspect of the invention containing sodium hydrogencarbonate, the sodium hydrogencarbonate also partially decreases the pH-buffering action of the sodium diacetate. More specifically, the agent according to the first aspect containing sodium hydrogencarbonate raises the alkalinity of the electrolyzed solution compared with the agent according to the first aspect free of sodium hydrogencarbonate.

In this manner, with the agent according to the first aspect of the invention containing sodium hydrogencarbonate, the adjustment of the sodium hydrogencarbonate content allows the alkalinity of the electrolyzed solution to be adjusted easily. More specifically, the agent according to the first aspect containing the sodium hydrogencarbonate eliminates adjustment of the amount of charge added to the electrolytic solution to adjust the alkalinity of the electrolyzed solution. In other words, with the agent according to the first aspect containing sodium hydrogencarbonate, the sodium diacetate content may be changed to adjust the acidity of the electrolyzed solution, and the sodium hydrogencarbonate content may be changed to adjust the alkalinity of the same electrolyzed solution. More specifically, with the agent according to the first aspect containing sodium hydrogencarbonate, simply changing the ratio between the constituents allows the pH of the electrolyzed solution to be adjusted finely.

In addition, the agent according to the first aspect of the invention is not liquid but in powder, particle, granule, or tablet form. The agent according to the first aspect is thus easier to handle than a liquid agent. More specifically, the hypochlorous acid water preparation agent according to the first aspect may be measured and divided into specified quantities for storage or transportation.

In addition, the powder, particle, granule, or tablet form of the agent according to the first aspect of the invention reduces the likelihood that a part of the hypochlorous acid water preparation agent is left in the container and unavailable when a specified quantity of the divided agent according to the first aspect is added to water. The agent according to the first aspect stored in the container can thus be used entirely.

In the first aspect of the invention, the powder form refers to powdery matter obtained by grinding the elements of the additive.

In addition, the particle form refers to a state in which a part or all of the elements of the additive have not been pulverized completely, with powder mixed with matter having a greater particle diameter than powder.

In addition, the granule form refers to a mixture of the elements of the additive formed simply without pulverization.

In addition, the tablet form refers to a tablet obtained by pulverizing the elements of the additive and then tableting the resultant powder.

A hypochlorous acid water preparation agent according to a second aspect of the invention is the hypochlorous acid water preparation agent according to the first aspect in which the additive contains no sodium hydrogencarbonate, and relative to 300 mL of water used to prepare the electrolytic solution to be electrolyzed, the additive has a sodium chloride content A (gw) satisfying $0.07 \leq A \leq 0.5$ and a sodium diacetate content X (gw) satisfying $0.08 \leq X$.

The second aspect of the invention has the same effects as the first aspect. In addition, the sodium chloride content A (gw) in the second aspect satisfying $0.07 \leq A \leq 0.5$ allows the electrolyzed solution to have a free residual chlorine concentration within the range of 10 to 120 ppm. This allows the electrolyzed hypochlorous acid water to be used without dilution.

When the sodium chloride content A (gw) in the second aspect of the invention falls below 0.07, the electrolyzed solution has a free residual chlorine concentration short of 10 ppm. In this case, sufficient sterilizing or deodorizing effect cannot be produced.

The sodium diacetate content X (gw) in the second aspect of the invention satisfying $0.08 \leq X$ allows the electrolyzed solution to have a pH value within the range of 4.5 to 6.5. This allows the electrolyzed hypochlorous acid water to contain at least 90 mol % of hypochlorous acid.

In the second aspect of the invention, the amount of sodium diacetate that maintains the pH value of the electrolyzed solution at 4.5 to 6.5 increases as the sodium chloride content A (gw) increases. Thus, when the sodium diacetate content X (gw) falls below 0.08 with the sodium chloride content A (gw) being 0.5, the resultant electrolyzed solution cannot have a pH value lower than or equal to 6.5.

A hypochlorous acid water preparation agent according to a third aspect of the invention is the hypochlorous acid water preparation agent according to the first aspect in which the additive contains sodium hydrogencarbonate, and relative to 300 mL of water used to prepare the electrolytic solution to be electrolyzed, the additive has a sodium chloride content A (gw) satisfying $0.07 \leq A \leq 0.5$, a sodium diacetate content X (gw) satisfying $0.3 \leq X$, and a sodium hydrogencarbonate content Y (gw) satisfying $Y \leq 0.67X$.

The third aspect of the invention has the same effects as the first aspect. In addition, the sodium chloride content A (gw) in the third aspect satisfying $0.07 \leq A \leq 0.5$ allows the electrolyzed solution to have a free residual chlorine concentration within the range of 10 to 120 ppm. This allows the electrolyzed hypochlorous acid water to be used without dilution.

When the sodium chloride content A (gw) in the third aspect of the invention falls below 0.07, the electrolyzed solution has a free residual chlorine concentration short of 10 ppm. In this case, sufficient sterilizing or deodorizing effect cannot be produced.

In the third aspect of the invention, the sodium diacetate content X (gw) satisfying $0.3 \leq X$ and the sodium hydrogencarbonate content Y (gw) satisfying $Y \leq 0.67X$ allow the electrolyzed solution to have a pH value within the range of 4.5 to 6.5. This allows the electrolyzed hypochlorous acid water to contain at least 90 mol % of hypochlorous acid.

A hypochlorous acid water preparation agent according to a fourth aspect of the invention is the hypochlorous acid water preparation agent according to the first aspect in which the additive contains sodium hydrogencarbonate, and relative to 300 mL of water used to prepare the electrolytic solution to be electrolyzed, the additive has a sodium chloride content A (gw) satisfying $0.07 \leq A \leq 0.5$, a sodium diacetate content X (gw) satisfying $0.15 \leq X < 0.3$, and a sodium hydrogencarbonate content Y (gw) satisfying $Y \leq (X-0.1)$.

The fourth aspect of the invention has the same effects as the first aspect. In addition, the sodium chloride content A (gw) in the fourth aspect satisfying $0.07 \leq A \leq 0.5$ allows the electrolyzed solution to have a free residual chlorine concentration within the range of 10 to 120 ppm. This allows the electrolyzed hypochlorous acid water to be used without dilution.

When the sodium chloride content A (gw) in the fourth aspect of the invention falls below 0.07, the electrolyzed solution has a free residual chlorine concentration short of 10 ppm. In this case, sufficient sterilizing or deodorizing effect cannot be produced.

In the fourth aspect of the invention, the sodium diacetate content X (gw) satisfying $0.15 \leq X < 0.3$ and the sodium hydrogencarbonate content Y (gw) satisfying $Y \leq (X-0.1)$ allow the electrolyzed solution to have a pH value within the range of 4.5 to 6.5. This allows the electrolyzed hypochlorous acid water to contain at least 90 mol % of hypochlorous acid.

A hypochlorous acid water preparation agent according to a fifth aspect of the invention is the hypochlorous acid water preparation agent according to the first aspect in which the additive contains sodium hydrogencarbonate, and relative to 300 mL of water used to prepare the electrolytic solution to be electrolyzed, the additive has a sodium chloride content A (gw) satisfying $0.07 \leq A \leq 0.3$, a sodium diacetate content X (gw) satisfying $0.08 \leq X < 0.15$, and a sodium hydrogencarbonate content Y (gw) satisfying $Y \leq (0.43X-0.014)$.

The fifth aspect of the invention has the same effects as the first aspect. In addition, the sodium chloride content A (gw) in the fifth aspect satisfying $0.07 \leq A \leq 0.3$ allows the electrolyzed solution to have a free residual chlorine concentration within the range of 10 to 70 ppm. This allows the electrolyzed hypochlorous acid water to be used without dilution.

When the sodium chloride content A (gw) in the fifth aspect of the invention falls below 0.07, the electrolyzed solution has a free residual chlorine concentration short of 10 ppm. In this case, sufficient sterilizing or deodorizing effect cannot be produced.

In the fifth aspect of the invention, the sodium diacetate content X (gw) satisfying $0.08 \leq X < 0.15$ and the sodium hydrogencarbonate content Y (gw) satisfying $Y \leq (0.43X-0.014)$ allow the electrolyzed solution to have a pH value within the range of 4.5 to 6.5. This allows the electrolyzed hypochlorous acid water to contain at least 90 mol % of hypochlorous acid.

A hypochlorous acid water preparation agent according to a sixth aspect of the invention is the hypochlorous acid water preparation agent according to the first aspect in which the additive contains sodium hydrogencarbonate, and relative to 300 mL of water used to prepare the electrolytic solution to be electrolyzed, the additive has a sodium chloride content A (gw) satisfying $0.07 \leq A \leq 0.5$, a sodium diacetate content X (gw) satisfying $0.2 \leq X$, and a sodium hydrogencarbonate content Y (gw) satisfying $Y \leq 0.05$.

The sixth aspect of the invention has the same effects as the first aspect. In addition, the sodium chloride content A (gw) in the sixth aspect satisfying $0.07 \leq A \leq 0.5$ allows the electrolyzed solution to have a free residual chlorine concentration within the range of 10 to 120 ppm. This allows the electrolyzed hypochlorous acid water to be used without dilution.

When the sodium chloride content A (gw) in the sixth aspect of the invention falls below 0.07, the electrolyzed solution has a free residual chlorine concentration short of 10 ppm. In this case, sufficient sterilizing or deodorizing effect cannot be produced.

In the sixth aspect of the invention, the sodium diacetate content X (gw) satisfying $0.2 \leq X$ and the sodium hydrogencarbonate content Y (gw) satisfying $Y \leq 0.05$ allow the electrolyzed solution to have a pH value approximate to 5. This allows the electrolyzed hypochlorous acid water to contain nearly 100 mol % of hypochlorous acid.

A hypochlorous acid water preparation agent according to a seventh aspect of the invention is the hypochlorous acid water preparation agent according to any one of the third to sixth aspects in which the additive is a tablet formed by tableting the elements.

The seventh aspect of the invention has the same effects as each of the second to sixth aspects. The tablet form of the hypochlorous acid water preparation agent according to the seventh aspect allows the agent to be handled more easily than the powder form, the particle form, or the granule form.

In the seventh aspect of the invention, all the elements added to the water are supplied as one or more, or more specifically, a single or not more than tens of solids (tablets).

In this case, simply adding the solid(s) to water measured beforehand allows all the elements for preparing hypochlorous acid water to be supplied quickly to the water in the proper quantity and in one operation.

Moreover, when the agent according to the seventh aspect of the invention, which contains sodium hydrogencarbonate as an essential element, is added to water, the tablet breaks easily in the water. Thus, the agent according to the seventh aspect allows each element to be dissolved smoothly in water.

Thus, the agent according to the seventh aspect of the invention can shorten the time taken to prepare hypochlorous acid water compared with a tablet containing no sodium hydrogencarbonate.

A hypochlorous acid water preparation package according to an eighth aspect of the invention includes the hypochlorous acid water preparation agent according to any one of the above first to seventh aspects, and a hermetic container storing the hypochlorous acid water preparation agent.

In the eighth aspect of the invention, the hypochlorous acid water preparation agent has the same effects as the hypochlorous acid water preparation agent according to each of the first to seventh aspects.

In the eighth aspect of the invention, the hermetic container also prevents the hypochlorous acid water preparation agent from absorbing moisture during storage or transportation of the hypochlorous acid water preparation agent. In this case, during the storage or transportation of the hypochlorous acid water preparation agent, the hermetic container prevents the hypochlorous acid water preparation agent from absorbing moisture, thus preventing a part of the elements from flowing out with moisture or being reacted with water and lost.

The hermetic container may be formed from a synthetic resin or a synthetic resin including a thin metal layer such as aluminum.

A hypochlorous acid water production method according to a ninth aspect of the invention includes adding a hypochlorous acid water preparation agent consisting of sodium chloride, sodium diacetate, and optional sodium hydrogencarbonate (baking soda) and being in powder form, particle form, granule form, or tablet form to a specified amount of water to produce an electrolytic solution, and electrolyzing the resultant electrolytic solution in a diaphragmless electrolytic cell to produce hypochlorous acid water.

In the ninth aspect of the invention, the hypochlorous acid water preparation agent has the same effects as the hypochlorous acid water preparation agent according to each of the first to seventh aspects.

In the ninth aspect of the invention, the above hypochlorous acid water preparation agent is added to the specified amount of measured water, and the solution is allowed to stand for a few minutes. The resultant electrolytic solution is electrolyzed. This simple procedure provides hypochlorous acid water containing at least 90 mol % of hypochlorous acid and usable without dilution.

Thus, the method according to the ninth aspect of the invention minimizes the effort to prepare hypochlorous acid water.

Advantageous Effects

In the first aspect of the invention, each of the sodium chloride that is an electrolyte, the sodium diacetate that is a pH adjustor, and the optional sodium hydrogencarbonate is not liquid. This allows the hypochlorous acid water preparation agent according to the first aspect to be provided as a solid in powder form, particle form, granule form, or tablet form.

This solid form can be handled more easily and with less concern than a hypochlorous acid water preparation agent supplied as liquid.

In the first aspect of the invention, hypochlorous acid water is prepared simply by measuring out a specified amount of water, adding (putting) the hypochlorous acid water preparation agent according to the first aspect to the water to produce an electrolytic solution, and electrolyzing the electrolytic solution. The resultant hypochlorous acid water has a pH value lower than the pH value of an electrolyzed solution obtained by electrolyzing a salt solution free of sodium diacetate. More specifically, the agent according to the first aspect allows production of hypochlorous acid water containing a higher percentage of hypochlorous acid than in an electrolyzed solution obtained by electrolyzing a salt solution free of sodium diacetate.

In other words, the agent according to the first aspect of the invention allows the user to produce hypochlorous acid water usable without dilution simply by measuring water, adding the hypochlorous acid water preparation agent according to the first aspect to the measured water, and activating an electrolytic device.

More specifically, unlike the above technique described in Patent Literature 1, the agent according to the first aspect of the invention eliminates complicated operations such as measuring an electrolyte to produce an electrolytic solution, diluting the electrolyzed solution, and mixing carbonated water into the diluted water to adjust the pH.

In addition, unlike the above technique described in Patent Literature 2, the agent according to the first aspect of the invention eliminates concern for changes in the concentration of the additive used to prepare the electrolytic solution or degeneration of the additive due to oxidation of the elements. Thus, the pH and the free residual chlorine concentration of hypochlorous acid water prepared with the agent according to the first aspect can be easily controlled to specific states.

Moreover, the hypochlorous acid water preparation agent according to the first aspect of the invention can be stored temporarily or transported after production as a compact article. In addition, when stored temporarily or transported, the produced hypochlorous acid water preparation agent according to the first aspect prevents a part of the constituents from being lost or degenerated.

The hypochlorous acid water preparation agent according to the first aspect of the invention can thus be handled easily when used, stored, or transported.

In other words, hypochlorous acid water prepared with the agent according to the first aspect of the invention has highly reproducible quality. More specifically, in the first aspect, the quality of the electrolyzed hypochlorous acid water is unlikely to vary depending on the user's skills or ability. Thus, the agent according to the first aspect allows any person to easily prepare hypochlorous acid water with originally intended quality in a short time.

Each of the elements of the agent according to the first aspect of the invention is harmless to the human body. This allows hypochlorous acid water prepared with the agent according to the first aspect to be without concern for the human body.

The second aspect of the invention has the same effects as the first aspect. Additionally, the agent according to the second aspect allows the electrolyzed hypochlorous acid water to have a pH value within the range of 4.5 to 6.5. This allows the electrolyzed hypochlorous acid water to contain at least 90 mol % of hypochlorous acid.

Thus, the agent according to the second aspect of the invention facilitates production of hypochlorous acid water with beneficial sterilizing and deodorizing effects and without concern for the human body.

Thus, in the second aspect of the invention, the use of the electrolyzed hypochlorous acid water can easily improve the living environment.

Each of the third to fifth aspects of the invention has the same effects as the first aspect. In addition, the hypochlorous acid water preparation agent according to each of the third to fifth aspects, while containing sodium hydrogencarbonate, allows the electrolyzed hypochlorous acid water to have a pH value within the range of 4.5 to 6.5. This allows the electrolyzed hypochlorous acid water to contain at least 90 mol % of hypochlorous acid.

Thus, the agent according to each of the third to fifth aspects of the invention facilitates production of hypochlorous acid water with beneficial sterilizing and deodorizing effects and without concern for the human body.

As a result, in each of the third to fifth aspects of the invention, the use of the prepared hypochlorous acid water can improve the human living environment.

In addition, the agent according to each of the third to fifth aspects of the invention allows the acidity of the electrolyzed solution to be adjusted as intended by changing the sodium diacetate content within the above range, and also allows the alkalinity of the electrolyzed solution to be adjusted as intended by changing the sodium hydrogencarbonate content within the above range.

In other words, the agent according to each of the third to fifth aspects of the invention allows the pH value of the electrolyzed hypochlorous acid water to easily become equal or approximate to an intended value within the range of 4.5 to 6.5.

Thus, the agent according to each of the third to fifth aspects of the invention can provide hypochlorous acid water with a pH value satisfying the user requests.

The sixth aspect of the invention has the same effects as the first aspect. Additionally, the agent according to the sixth aspect allows the electrolyzed hypochlorous acid water to have a pH value approximate to 5. This allows the electrolyzed hypochlorous acid water to contain nearly 100 mol % of hypochlorous acid.

Thus, the agent according to the sixth aspect of the invention allows production of hypochlorous acid water without concern for the human body and having sterilizing and deodorizing effects more beneficial than with the agent according to each of the third to fifth aspects.

The seventh aspect of the invention has the same effects as each of the third to sixth aspects. Additionally, the hypochlorous acid water preparation agent according to the seventh aspect is a tablet, thus allowing all the elements for preparing hypochlorous acid water to be supplied rapidly to the water in the proper quantity.

Moreover, the agent according to the seventh aspect of the invention breaks easily in water and thus shortens the time taken to produce hypochlorous acid water.

Additionally, the hypochlorous acid water preparation agent according to the seventh aspect of the invention may be more compact than in powder form, particle form, or granule form and thus be handled more easily when stored or transported.

In the eighth aspect of the invention, the hypochlorous acid water preparation agent has the same effects as in each of the first to seventh aspects. Additionally, the hermetic container in the eighth aspect maintains the airtight and watertight state immediately before the use of the hypochlorous acid water preparation agent.

Thus, in the eighth aspect of the invention, the hypochlorous acid water preparation agent with each element measured beforehand is sealed in the hermetic container, preventing the hypochlorous acid water preparation agent from accidentally absorbing moisture when the hypochlorous acid water preparation agent is stored over a long period or transported. This prevents the elements of the hypochlorous acid water preparation agent from coming in contact with moisture, thus preventing a part of the constituents from being lost due to a reaction between the elements or a part of the constituents from being degenerated.

This prevents variations in the quality of hypochlorous acid water prepared with the agent according to the eighth aspect of the invention.

In the eighth aspect of the invention, the user may simply open the hermetic container and add the contained hypochlorous acid water preparation agent to water. The package according to the eighth aspect can thus improve the workability for preparing hypochlorous acid water.

The method according to the ninth aspect of the invention is a procedure for producing hypochlorous acid water with the hypochlorous acid water preparation agent according to each of the first to seventh aspects.

Thus, in the ninth aspect of the invention, the hypochlorous acid water preparation agent has the same effects as in each of the first to seventh aspects.

The method according to the ninth aspect of the invention allows the user to rapidly prepare and use hypochlorous acid water as appropriate without complicated measurement.

In addition, the method according to the ninth aspect of the invention includes few actions performed by the user, thus preventing variations in the quality of the electrolyzed hypochlorous acid water.

BRIEF DESCRIPTION OF THE DRAWINGS

FIG. 3 is a graph showing free residual chlorine concentrations that change over time after electrolysis of several samples in tables 1 and 2.

FIGS. 4A and 4B are schematic diagrams each showing a hypochlorous acid water preparation package according to one or more embodiments of the present invention.

FIG. 7 is an exploded side view of the electrolytic device used to prepare hypochlorous acid water with the hypochlorous acid water preparation agent according to the embodiment of the present invention.

DETAILED DESCRIPTION

Figure 1:
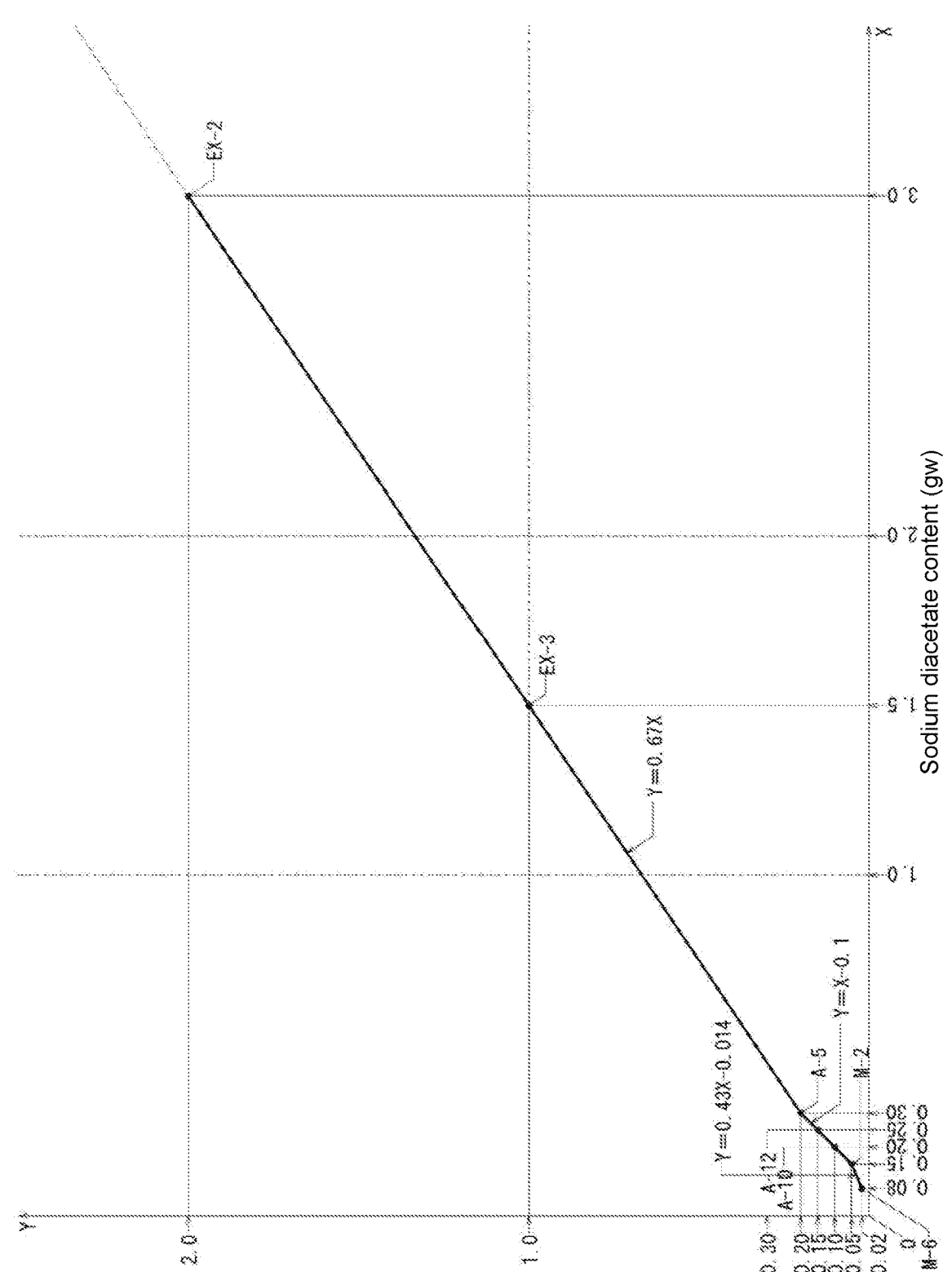
FIG. 1 is a two-dimensional graph showing test results for electrolyzed solutions having pH values approximate to 6.5 extracted from table 2 and plotted with the sodium diacetate (element ii) contents (unit: gw) on the X-axis and the sodium hydrogencarbonate (element iii) contents (unit: gw) on the Y-axis.

A hypochlorous acid water preparation agent and a hypochlorous acid water preparation package according to one or more embodiments of the present invention will now be described in detail with reference to tables 1 and 2 and FIGS. 1 to 11.

1: Embodiment of Present Invention

A hypochlorous acid water preparation agent according to an embodiment of the present invention will now be described.

The hypochlorous acid water preparation agent according to the present embodiment is an additive used to prepare hypochlorous acid water by electrolyzing an electrolytic solution obtained by dissolving an electrolyte in a specified amount of water. The additive consists of sodium chloride, sodium diacetate, and optional sodium hydrogencarbonate (baking soda) and is in powder form, particle form, granule form, or tablet form.

More specifically, the hypochlorous acid water preparation agent according to the present embodiment is in any one of powder form, particle form, granule form, and tablet form and one of the two element sets, one set consisting of two elements, or sodium chloride and sodium diacetate (example 1), and the other set consisting of three elements, or sodium chloride, sodium diacetate, and sodium hydrogencarbonate (example 2).

The hypochlorous acid water preparation agent according to the present embodiment refers herein to both the hypochlorous acid water preparation agents according to examples 1 and 2.

The sodium chloride of the hypochlorous acid water preparation agent according to the present embodiment provides the chlorine atoms of hypochlorite ions present in the electrolyzed solution, or the hypochlorous acid water, resulting from electrolysis of an electrolytic solution obtained by dissolving the hypochlorous acid water preparation agent in water.

The pH value of a 0.1 mol/L sodium diacetate solution, although varying slightly depending on the manufacturer, typically falls within the range of 4.5 to 5. Thus, the sodium diacetate of the hypochlorous acid water preparation agent according to the present embodiment adjusts the pH value of the electrolyzed hypochlorous acid water to be within the range of 4.5 to 6.5. This allows the percentage of hypochlorous acid to be at least 90 mol % in the hypochlorous acid water prepared with the hypochlorous acid water preparation agent according to the present embodiment.

More specifically, for the hypochlorous acid water preparation agent according to example 1, the concentration of free residual chlorine in the electrolyzed hypochlorous acid water depends on the sodium chloride content.

Moreover, for the hypochlorous acid water preparation agent according to example 1, adjusting the sodium diacetate content allows the pH value of the electrolyzed hypochlorous acid water to be adjusted as intended.

When the hypochlorous acid water preparation agent according to example 2 is dissolved in water, its sodium hydrogencarbonate reacts with acetic acid produced from the dissociation of the sodium diacetate in water to generate carbon dioxide. In other words, when the hypochlorous acid water preparation agent according to example 2 is dissolved in water, the acetic acid produced from the dissociation of the sodium diacetate is partially consumed by reacting with the sodium hydrogencarbonate. Thus, for the hypochlorous acid water preparation agent according to example 2, the pH-buffering action by the sodium diacetate in the electrolyzed solution is partially decreased by the sodium hydrogencarbonate. As a result, the hypochlorous acid water preparation agent according to example 2 slightly raises the pH value of the electrolyzed hypochlorous acid water compared with the hypochlorous acid water preparation agent according to example 1 containing the same amount of sodium diacetate, or in other words, slightly lowers the acidity of the hypochlorous acid water.

However, the sodium hydrogencarbonate of the hypochlorous acid water preparation agent according to example 2 does not increase or decrease the hypochlorite ion concentration in the electrolyzed hypochlorous acid water.

Thus, also for the hypochlorous acid water preparation agent according to example 2, the concentration of free residual chlorine in the electrolyzed hypochlorous acid water depends on the sodium chloride content similarly to the hypochlorous acid water preparation agent according to example 1.

Additionally, for the hypochlorous acid water preparation agent according to example 2, adjusting the sodium diacetate content and the sodium hydrogencarbonate content allows fine adjustment of the pH of the electrolyzed hypochlorous acid water.

More specifically, the hypochlorous acid water preparation agent according to example 2 facilitates preparation of hypochlorous acid water having the originally intended pH value.

In addition, when the hypochlorous acid water preparation agent according to example 2 is placed into water, carbon dioxide gas is generated.

Thus, when the hypochlorous acid water preparation agent according to example 2 particularly formed as a tablet by tableting the elements is placed into water, the carbon dioxide arising from the tablet can smoothly break the tablet.

Thus, the hypochlorous acid water preparation agent according to example 2 particularly formed as a tablet by tableting the elements allows the elements to be dissolved quickly in water.

2: Principle of Hypochlorous Acid Water Generation

The principle of hypochlorous acid water generation from the hypochlorous acid water preparation agent according to the present embodiment and water will now be described.

2-1-1: Hypochlorous Acid Water Preparation Agent According to Example 1

The elements of the hypochlorous acid water preparation agent according to example 1 will be specified below.
(1) Element i: Sodium Chloride (Common Salt)
    Chemical formula: $NaCl$
    Molecular weight: 58.5
    Atomic weight:
    Na (sodium): 23.0
    Cl (chlorine): 35.5
(2) Element ii: Sodium Diacetate
    Chemical formula: $NaH(C_2H_3O_2)_2$
    Molecular weight: 142
    Atomic weight:
    O (oxygen): 16
    C (carbon): 12
    H (hydrogen): 1
    (3) Equivalents of Elements Relative to 300 mL of Solvent Water
    Element i: sodium chloride
    510 mgw=0.51/58.5=8.7 mmol: 29 mmol/L
    Element ii: sodium diacetate
    210 mgw=0.21/142=1.5 mmol: 4.9 mmol/L

2-1-2: Electrolytic Solution with Elements i and ii Dissolved

In the electrolytic solution obtained by adding element i and element ii measured as described above to 300 mL of water, the elements are present as the ions described below.

$$H_2O \rightarrow H^+ + OH^-$$

$$NaCl \rightarrow Cl^- + Na^+$$

$$CH_3COONa \rightarrow CH_3COO^- + Na^+$$

$$CH_3COOH \rightarrow CH_3COO^- + H^+$$

The acetic acid electrolytic dissociation equilibrium will now be described. Element ii, which is sodium diacetate, dissociates in water into acetic acid and sodium acetate, and the equilibrium equation below holds.

$$[CH_3COO^-][H^+]/[CH_3COOH] = K_a = 1.75 \times 10^{-5} \quad \text{Equilibrium equation:}$$

where $K_a$ in the equilibrium equation is an electrolytic dissociation constant.

The equilibrium equation yields equation 1 below.

$$[H^+] = K_a \times [CH_3COOH]/[CH_3COO^-] \qquad \text{Equation 1:}$$

The sodium acetate dissociates almost completely in the water, and thus relational expression 1 below holds.

$$[CH_3COO^-] \approx [CH_3COONa] \qquad \text{Relational expression 1:}$$

Based on equation 1 and relational expression 1, the hydrogen-ion concentration ($[H^+]$ mol/L) is expressed as equation 2 below.

Based on the hydrogen-ion concentration ($[H^+]$ mol/L) calculated from equation 2 below, the pH of the electrolytic solution in which elements i and ii are dissolved can be determined from equation 3 below.

$$
\begin{aligned}
[H^+] &= K_a \times [CH_3COOH]/[CH_3COO^-] &&\text{Equation 2} \\
&= K_a \times [CH_3COOH]/[CH_3COONa] \\
&= K_a \times 12[mmol/L]/12[mmol/L] \\
&= K_a \\
pH &= -\log[H^+] &&\text{Equation 3} \\
&= -\log(K_a) \\
&= 4.76
\end{aligned}
$$

2-1-3: Electrolysis of Electrolytic Solution

When the electrolytic solution obtained by dissolving element i and element ii in 300 mL of water is electrolyzed in a diaphragmless electrolytic cell, the reactions described below occur at the anode and the cathode.

Anode $$2NaCl \rightarrow Cl_2 + 2e^- + 2Na^+$$

$$Cl_2 + H_2O \rightarrow HCl + HClO(K_w = 1.56 \times 10^{-4})$$

In other words, the reaction below occurs at the anode.

$$2NaCl + H_2O \rightarrow HCl + HclO + 2e^- + 2Na^+$$

Cathode $$2H_2O + 2e^- \rightarrow H_2\uparrow + 2OH^-$$

When the electrolytic solution is electrolyzed, hydroxide ions are produced at the cathode, and the electrolytic solution becomes alkaline. Hydrogen ions from the hypochlorous acid, which is a weak acid, combine with hydroxide ions produced at the cathode to form water, and the hypochlorous acid as a free acid forms sodium hypochlorite, which is a hypochlorite. This sodium hypochlorite also dissociates.

More specifically, when the electrolytic solution obtained by dissolving the hypochlorous acid water preparation agent according to example 1 in 300 mL of water is electrolyzed in a diaphragmless electrolytic cell, reactions occur at the anode and the cathode as summarized below.

$$2NaCl+H_2O+2H_2O$$

$$\rightarrow HCl+HclO+2Na^++2OH^-+H_2\uparrow$$

$$\rightarrow HCl+H^++ClO^-+2Na^++2OH^-+H_2\uparrow$$

$$\rightarrow H^++Cl^-+H_2O+ClO^-+2Na^++OH^-+H_2\uparrow$$

$$\rightarrow Cl^-+2H_2O+ClO^-+2Na^++H_2\uparrow$$

$$\rightarrow Na^++Cl^-+(Na^++ClO^-)+2H_2O+H_2\uparrow$$

$$HCl\leftrightarrow H^++Cl^-$$

$$HclO\leftrightarrow H^++ClO^-$$

$$NaClO\leftrightarrow Na^++ClO^-$$

2-1-4: Buffering Action of Element ii in Electrolytic Solution

The buffering action of the sodium diacetate, which is element ii, in the electrolytic solution will now be described.

The sodium diacetate dissociates in the water to provide acetic acid and sodium acetate.

$$NaH(C_2H_3O_2)_2\rightarrow CH_3COOH+CH_3COONa$$

$$CH_3COOH\rightarrow CH_3COO^-+H^+$$

$$CH_3COONa\rightarrow CH_3COO^-+Na^+$$

In this state, the sodium acetate dissociates almost completely in the water, and thus relational expression 1 above holds.

Based on equation 1 and relational expression 1, the hydrogen-ion concentration ($[H^+]$ mol/L) can be expressed as equation 4 below. $K_a$ is an electrolytic dissociation constant.

When the acetic acid concentration $[CH_3COOH]$ is denoted by Ca (mol/L), and the sodium acetate concentration $[CH_3COONa]$ is denoted by Cs (mol/L), the resultant hydrogen-ion concentration ($[H^+]$ mol/L) may be used to calculate the pH of the electrolytic solution from equation 5 below.

$$[H^+] = K_a \times [CH_3COOH]/[CH_3COO^-] \qquad \text{Equation 4}$$

$$= K_a \times [CH_3COOH]/[CH_3COONa]$$

$$\approx K_a \times Ca/Cs$$

$$pH = -\log[H^-] \qquad \text{Equation 5}$$

$$= -\log(K_a \times Ca/Cs)$$

$$= -\log K_a - \log(Ca/Cs)$$

With the sodium diacetate, which is element ii, dissociated as described above in water and with element i contained, electrolyzing the aqueous solution by passing an electric current generates hydrochloric acid (HCl), which is a strong acid. Because the electrolytic dissociation degree of hydrochloric acid is much greater than the electrolytic dissociation degree of acetic acid, which is a weak acid, the hydrochloric acid resulting from the electrolysis releases all the hydrogen ions to liberate an equivalent amount of acetic acid that has dissociated into acetate ions and hydrogen ions.

Thus, when 0.1 mol of hydrochloric acid (HCl) is generated by electrolyzing a buffer obtained by dissolving 1 mol of sodium diacetate in 1 L of water, the pH of the buffer is calculated as described below based on equation 3 and equation 5.

$$pH = -\log K_a - \log(Ca + 0.1)/(Cs - 0.1)$$

$$= 4.76 - \log(1.1/0.9)$$

$$= 4.76 - 0.087$$

$$= 4.67$$

2-1-5: pH of Electrolytic Solution with Constant Concentration of Element ii and Varying Amounts of HCl Generated by Electrolysis To 1 L of water, p (mol) of sodium chloride as element i and n (mol) of sodium diacetate as element ii are added, and the solution is electrolyzed to generate k (mol) of hydrochloric acid (HCl) (k<p and k<n).

$$[NaCl]=p \text{ (mol/L)}$$

$$[NaH(C_2H_3O_2)_2]=n \text{ (mol/L)}$$

In the electrolytic solution containing the products of electrolysis at the anode and the cathode, the reaction below occurs.

$$kHCl+kHClO+2kNa^++2kOH^-+kH_2\uparrow+nCH_3COO^-+$$
$$nNa^++nCH_3COOH$$

$$\rightarrow kNa^++kCl^-+kH_2O+kHClO+kNa^++kOH^-+kH_2\uparrow+$$
$$nCH_3COO^-+nNa^++nCH_3COOH$$

In the reaction formula, k (mol) of HCl and k (mol) of NaOH neutralize each other. The reaction formula is further expressed as described below.

$$\rightarrow kNa^++kCl^-+kH_2O+kHClO+kH_2\uparrow+(n+k)$$
$$CH_3COO^-+(n+k)Na^++kH_2O+(n-k)CH_3COOH$$

The hydroxide ion ($OH^-$) in the remaining k (mol) of NaOH reacts with k (mol) of acetic acid to form $kH_2O$ and $kCH_3COO^-$. This reaction is the buffering action of the sodium diacetate in the electrolytic solution.

The pH of the electrolyzed solution obtained by electrolyzing the electrolytic solution containing elements i and ii, or the hypochlorous acid water, can be calculated from equation 6 below.

$$pH=-\log K_a-\log(n-k)/(n+k) \qquad \text{Equation 6:}$$

When the sodium diacetate (element ii) concentration in the electrolytic solution is constant, and the amount of hydrochloric acid (HCl) arising from the electrolysis varies as described below, the pH can be calculated from equation 6 in the manner described below.

(a) For $n = 1$ and $k = 0.01$, $$pH = -\log(1.75 \times 10^{-5}) - \log(1 - 0.01)/(1 + 0.01)$$

$$= 4.76 + 0.0087$$

-continued $$= 4.77.$$

With the above n and k values, the pH value of the electrolytic solution becomes slightly higher.

(b) For $n = 1$ and $k = 0.1$, $$pH = -\log(1.75 \times 10^{-5}) - \log(1 - 0.1)/(1 + 0.1)$$

$$= 4.76 + 0.087$$

$$= 4.85.$$

(c) For $n = 1$ and $k = 0.5$, $$pH = -\log(1.75 \times 10^{-5}) - \log(1 - 0.5)/(1 + 0.5)$$

$$= 4.76 + 0.48$$

$$= 5.24.$$

(d) For $n = 1$ and $k = 0.8$, $$pH = -\log(1.75 \times 10^{-5}) - \log(1 - 0.8)/(1 + 0.8)$$

$$= 4.76 + 0.95$$

$$= 5.71.$$

(e) For $n = 1$ and $k = 0.99$, $$pH = -\log(1.75 \times 10^{-5}) - \log(1 - 0.99)/(1 + 0.99)$$

$$= 4.76 + 2.30$$

$$= 7.06.$$

With the above n and k values, the pH value of the electrolytic solution increases toward the neutral point as the electrolysis proceeds.

2-1-6: Overview

Residual chlorine is typically classified into two types: free residual chlorine and combined residual chlorine. Residual chlorine is also referred to as total residual chlorine. Simply residual chlorine refers commonly to free residual chlorine.

Free residual chlorine is also bactericidal chlorine in water. The concentration of free residual chlorine is the total concentration of three types of molecules in water: chlorine gas ($Cl_2$), hypochlorous acid (HClO), and hypochlorite ions ($ClO^-$). Their percentages vary depending on the pH of the aqueous solution containing the free residual chlorine (refer to FIG. 2 in Similarity between Hypochlorous Acid Water and Sodium Hypochlorite [reference 1, URL: https://www.mhlw.go.jp/shingi/2009/08/dl/s0819-8k.pdf] published on the website of the Ministry of Health, Labour and Welfare). Free residual chlorine differs from chlorine ions ($Cl^-$) in chemical properties, and chlorine ions are not included in free residual chlorine.

Combined residual chlorine is a combination of the above residual chlorine with an amine or ammonia and referred to as a chloramine.

As described in 2: Principle of Hypochlorous Acid Water Generation, the hypochlorous acid water, or the electrolyzed solution, prepared with the hypochlorous acid water preparation agent according to example 1 contains no combined residual chlorine. However, combined residual chlorine may be present as unintended impurities during the electrolysis.

Thus, theoretically all the residual chlorine in the electrolyzed solution prepared with the hypochlorous acid water preparation agent according to example 1 is free residual chlorine. In addition, as described above, the percentage of hypochlorous acid (HClO) in water depends on the pH of the aqueous solution.

Figure 2:
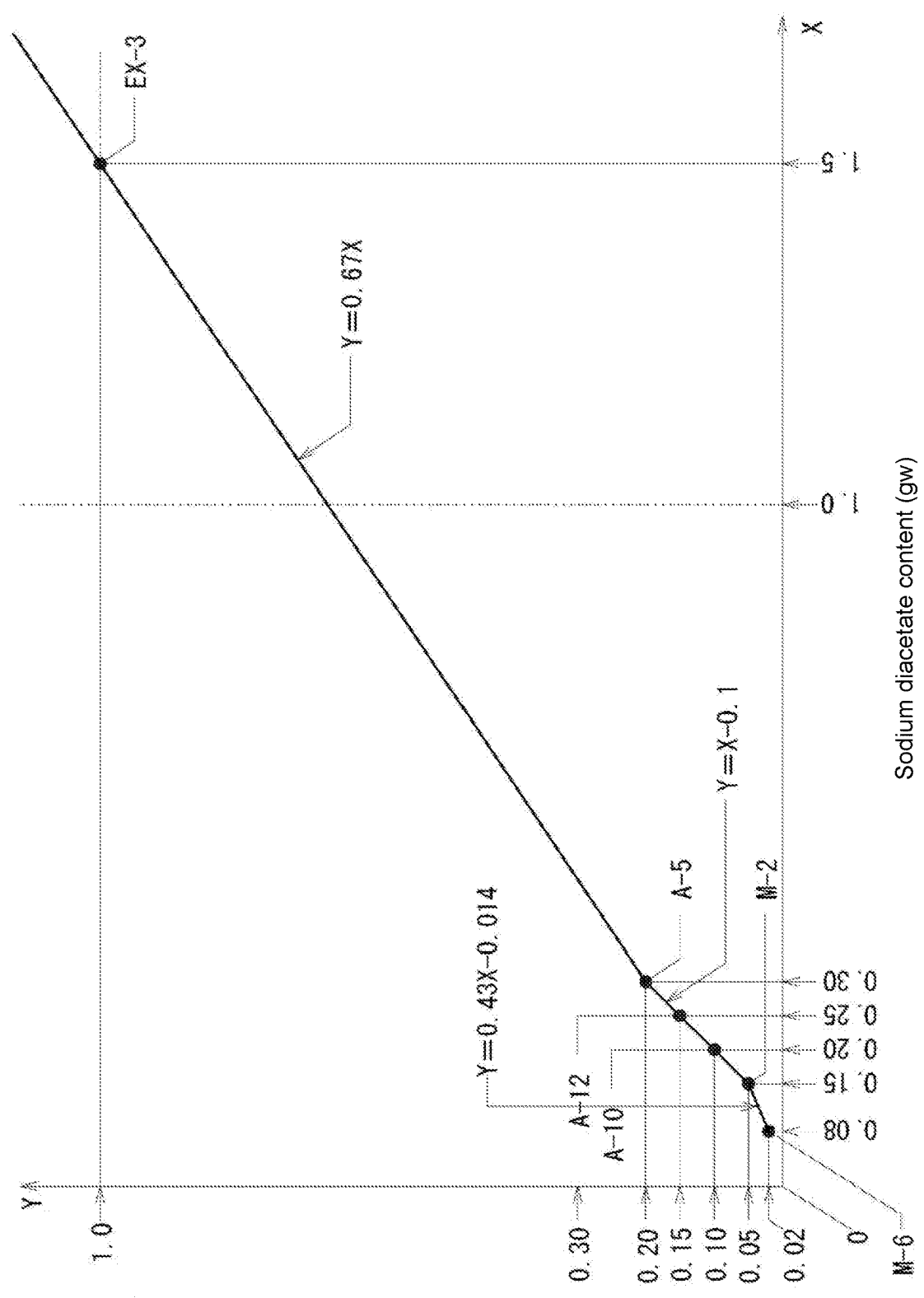
FIG. 2 is an enlarged view of an area near the origin of the graph in FIG. 1.

More specifically, when an aqueous solution containing hypochlorite ions ($ClO^-$) has a pH value within the range of 4.5 to 6.5, at least 90 mol % of the hypochlorite ions ($ClO^-$) present in the aqueous solution is hypochlorous acid (HClO) (refer to FIG. 2 in reference 1).

Thus, as described in (a) to (e) of 2-1-5: pH of Electrolytic Solution with Constant Concentration of Element ii and Varying Amounts of HCl Generated by Electrolysis, the hypochlorous acid water preparation agent according to example 1 can theoretically adjust the pH value of the electrolyzed solution to be within the range of 4.5 to 6.5 due to element ii, which is the sodium diacetate contained as a buffer.

More specifically, for the hypochlorous acid water preparation agent according to example 1, simply electrolyzing the electrolytic solution in a diaphragmless electrolytic cell can achieve an electrolyzed solution with a pH at which hypochlorous acid (HClO) represents a high percentage.

This effect is produced easily when the equivalent (n) of sodium diacetate in an electrolytic solution is greater than the equivalent (k) of hydrochloric acid arising from electrolysis.

2-2-1: Hypochlorous Acid Water Preparation Agent According to Example 2

The hypochlorous acid water preparation agent according to example 2 contains elements i and ii, which are already indicated in 2-1-1: Hypochlorous Acid Water Preparation Agent according to Example 1, and also a specified amount of sodium hydrogencarbonate as element iii. In the hypochlorous acid water preparation agent according to example 2, the amount of element iii is smaller than the amount of element ii.

(3) Element iii: Sodium Hydrogencarbonate (Baking Soda) Chemical formula: $NaHCO_3$ The specific numerical range of the amount of element iii in the hypochlorous acid water preparation agent according to example 2 is described later with reference to test results.

2-2-2: Advantages and Effects of Contained Element iii

The sodium hydrogencarbonate, which is element iii, in the hypochlorous acid water preparation agent according to example 2 generates carbon dioxide when added to water together with element ii, which is sodium diacetate.

More specifically, when the hypochlorous acid water preparation agent according to example 2 is placed into water, reactions occur as described below.

Dissociation of Sodium Diacetate $$NaH(C_2H_3O_2)_2 + H_2O$$

$$\rightarrow Na^+[CH_3COO]^- + H^+[CH_3COO]^- + H^+ + NaOH$$

Reaction of Sodium Hydrogencarbonate with Acetic Acid Produced from Dissociation of Sodium Diacetate $$NaHCO_3 + CH_3COOH \rightarrow CH_3COONa + H_2O + CO_2\uparrow$$

As described above, when dissolved in water together with element ii, which is sodium diacetate, the sodium hydrogencarbonate, which is element iii, reacts with acetic acid produced from the dissociation of sodium diacetate to generate carbon dioxide gas.

In other words, element iii in the hypochlorous acid water preparation agent according to example 2 partially decreases the pH-buffering action by element ii in the electrolyzed solution.

Thus, although the hypochlorous acid water preparation agent according to one or more embodiments of the present invention may not contain sodium hydrogencarbonate as element iii, the addition of element iii can produce additional effects as described below.

More specifically, when the hypochlorous acid water preparation agent according to example 2 formed as, for example, a tablet by tableting the elements is placed into water, the sodium hydrogencarbonate reacts with acetic acid produced from the dissociation of the sodium diacetate to generate carbon dioxide gas, which can smoothly break the tablet in water.

More specifically, when the hypochlorous acid water preparation agent according to example 2 formed as a tablet has a total weight of, for example, 1.0 gw and contains no sodium hydrogencarbonate as element iii, the tablet takes about three minutes to break in water.

In contrast, when the tablet contains sodium hydrogencarbonate in an amount corresponding to, for example, 1 wt % of the total weight of the tablet, the tablet takes about one minute to break.

Element iii in the hypochlorous acid water preparation agent according to example 2 decreases the action of element ii partially. However, when the hypochlorous acid water preparation agent according to example 2 is placed into water, element iii shortens the time taken by the constituents to dissolve in the water.

Thus, the hypochlorous acid water preparation agent according to example 2 can shorten the time taken to prepare hypochlorous acid water compared with the hypochlorous acid water preparation agent according to example 1 in tablet form.

For the hypochlorous acid water preparation agent according to example 2, adjusting the amount of element iii, or the sodium hydrogencarbonate content, allows the alkalinity of the electrolyzed hypochlorous acid water to be adjusted as intended.

For the hypochlorous acid water preparation agent according to the present embodiment, as already described in 2-1-5: pH of Electrolytic Solution with Constant Concentration of Element ii and Varying Amounts of HCl Generated by Electrolysis, when the current passing rate for electrolysis is constant, longer electrolysis causes the pH value of the electrolyzed solution to be higher. In other words, the alkalinity of the electrolyzed solution increases in proportion with the electrolysis time.

Thus, when the user wants hypochlorous acid water with a pH value of, for example, 6.0, the electrolysis time to be set may be calculated back from the amount of hydrochloric acid produced by the electrolysis.

However, an unskillful user cannot easily produce hypochlorous acid water with an intended pH value.

In contrast, the hypochlorous acid water preparation agent according to example 2 allows any user to finely adjust the pH of the electrolyzed solution without changing the current passing time for the electrolytic solution, using the ability of element iii, which is sodium hydrogencarbonate, to decrease the pH-buffering action by element ii, which is sodium diacetate.

More specifically, the hypochlorous acid water preparation agent according to example 2 allows the pH value of the electrolyzed solution to be equal or approximate to a target value within the range of 4.5 to 6.5 by simply adjusting the sodium hydrogencarbonate (element iii) content as appropriate.

In this case, when causing the pH value of the hypochlorous acid water to be equal or approximate to a target value, the user may not operate the electrolytic device to adjust the current passing rate for electrolysis or the current passing time.

Thus, the hypochlorous acid water preparation agent according to example 2 also facilitates preparation of hypochlorous acid water with an intended pH value.

In the preparation of hypochlorous acid water with the hypochlorous acid water preparation agent according to example 2, hypochlorous acid (HClO) and hypochlorite ions (ClO⁻) are generated based on the same principle as with the hypochlorous acid water preparation agent according to example 1.

Thus, the electrolyzed solution, or the hypochlorous acid water, prepared with the hypochlorous acid water preparation agent according to example 2 also contains no combined residual chlorine. However, combined residual chlorine may be present as unintended impurities during the electrolysis.

Thus, theoretically all the residual chlorine in the electrolyzed solution prepared with the hypochlorous acid water preparation agent according to example 2 is free residual chlorine.

As described later with reference to experimental results, the concentration of free residual chlorine in the electrolyzed solution prepared with the hypochlorous acid water preparation agent according to example 2 is substantially the same as with the hypochlorous acid water preparation agent according to example 1, which contains no sodium hydrogencarbonate as element iii. In other words, the concentration of free residual chlorine in the electrolyzed hypochlorous acid water according to one or more embodiments of the present invention depends merely on the sodium chloride content.

3: Effects of Hypochlorous Acid Water Preparation Agent According to Embodiment of Present Invention The above hypochlorous acid water preparation agent according to the present embodiment has the effects described below. The hypochlorous acid water preparation agent according to the present embodiment is placed into a specified amount of water measured beforehand to form an electrolytic solution, and the electrolytic solution may be simply electrolyzed to produce hypochlorous acid water. The resultant solution is usable without dilution and contains a high percentage of hypochlorous acid (HClO) compared with hypochlorous acid water prepared without element ii, which is sodium diacetate.

The hypochlorous acid water preparation agent according to the present embodiment facilitates preparation and use of hypochlorous acid water having beneficial sterilizing and deodorizing effects, thus easily improving the comfortability of human living spaces.

Additionally, the elements of the hypochlorous acid water preparation agent according to the present embodiment, or sodium chloride as element i, sodium diacetate as element ii, and sodium hydrogencarbonate optionally contained as element iii, are found to have no concern for the human body.

The safety of sodium diacetate for the human body is, for example, described in REREGISTRATION ELIGIBILITY DOCUMENT SODIUM DIACETATE, LIST D, CASE 4001, ACETIC ACID by ENVIRONMENTAL PROTECTION AGENCY OFFICE OF PESTICIDE PROGRAMS SPECIAL REVIEW AND REREGISTRATION DIVISION WASHINGTON, D.C. (URL: https://www3.epa.gov/pesticides/chem_search/reg_actions/reregistration/red PC-044008_1-Sep-91.pdf).

Thus, the hypochlorous acid water preparation agent according to the present embodiment merely contains water and elements without concern for the human body and facilitates preparation of hypochlorous acid water containing a high percentage of hypochlorous acid.

In particular, the hypochlorous acid water preparation agent according to example 2 in tablet form shortens the time taken to prepare hypochlorous acid water compared with the hypochlorous acid water preparation agent according to example 1 in tablet form.

In addition, the hypochlorous acid water preparation agent according to example 2 allows the pH of the electrolyzed solution to be adjusted more easily than the hypochlorous acid water preparation agent according to example 1.

4: Element Contents

The element contents according to the embodiment of the present invention will now be described in detail with reference to tables 1 and 2 and FIG. 1.

4-1: Element Contents of Hypochlorous Acid Water Preparation Agent According to Example Table 1 below shows the measurement results of the pH values and the free residual chlorine concentrations of electrolyzed solutions obtained by electrolyzing electrolytic solutions containing varying amounts of sodium chloride as element i and sodium diacetate as element ii.

The samples and the devices used in the tests shown in table 1 are specified below. As described above, in each electrolyzed solution prepared with the hypochlorous acid water preparation agent according to example 1, theoretically all the residual chlorine is free residual chlorine. Thus, each value expressed in ppm in table 1 is substantially the sum of two concentrations of hypochlorous acid (HClO) and hypochlorite ions (ClO⁻). The measuring instrument used to measure free residual chlorine concentrations shown in table 1 and tables 2 and 3, which are shown much later, measures the residual chlorine described above, and measurements from the measuring instrument, or values expressed in ppm in tables 1 to 3, do not include concentrations of chlorine ion (Cl⁻).

Water: tap water (test site: Hong Kong), 300 mL/sample
Element i (sodium chloride):
Samples S-1 to S-3: Mediterranean Sea Salt (brand name: Meadows) manufactured by The Dairy Farm Company, Limited
Samples T-1 to T-17: Seto no Honjio (registered trademark) manufactured by Ajinomoto Co., Inc.
Other samples: Shokutakuen (table salt) manufactured by The Salt Industry Center of Japan
Element ii (sodium diacetate): Sodium Diacetate manufactured by FUJIFILM Wako Pure Chemical Corporation
Electrolytic device: Clean-Jug manufactured by Momax Technology Ltd. (MOMAX)
Electrolytic cell type: membraneless Power consumption: 17.5±1 W
Current: 165 mA
Electrolytic cell volume: 300 mL
Electrolysis time (current passing time): 3 min
Balance used to weigh elements: GX-200 manufactured by A&D Company, Limited
pH meter: edge HI 2002-01 (pH-only) manufactured by Hanna Instruments JAPAN
Measuring instrument used to measure free residual chlorine concentrations: Ultra High Range Chlorine Portable Photometer—HI96771 (ultrahigh concentration for all free chlorine/low concentration for free chlorine) manufactured by Hanna Instruments JAPAN

TABLE 1

| Sample | Element i Sodium chloride (gw) | Element ii Sodium diacetate (gw) | Element iii Sodium hydrogen-carbonate (gw) | pH after electrolysis | Free residual chlorine concentration (ppm) |
|---|---|---|---|---|---|
| S-1 | 3.113 | 0 | 0 | 8.7 | 260 |
| S-2 | 1.556 | 0 | 0 | 8.8 | 177 |
| S-3 | 0.778 | 0 | 0 | 8.8 | 106 |
| T-1 | 0.516 | 0.050 | 0 | 6.42 | 62 |
| T-6 | 0.721 | 0.077 | 0 | 6.15 | 73 |
| T-2 | 0.719 | 0.107 | 0 | 5.65 | 79 |
| T-4 | 0.701 | 0.124 | 0 | 5.41 | 92 |
| T-7 | 0.683 | 0.132 | 0 | 5.42 | 91 |
| T-13 | 0.714 | 0.160 | 0 | 5.15 | 75 |
| T-8 | 0.729 | 0.170 | 0 | 5.23 | 114 |
| T-11 | 0.513 | 0.198 | 0 | 5.02 | 79 |
| T-12 | 0.497 | 0.200 | 0 | 5.05 | 77 |
| T-10 | 0.698 | 0.203 | 0 | 5.15 | 113 |
| T-9 | 0.520 | 0.203 | 0 | 5.05 | 76 |
| T-3 | 0.567 | 0.210 | 0 | 4.99 | 75 |
| T-5 | 0.703 | 0.214 | 0 | 5.07 | 89 |
| T-14 | 0.500 | 0.200 | 0 | 4.99 | 74 |
| T-15 | 0.471 | 0.203 | 0 | 5.11 | 81 |
| T-16 | 0.506 | 0.204 | 0 | 5.09 | 82 |
| T-17 | 0.431 | 0.200 | 0 | 5.17 | 72 |
| B-1 | 0.702 | 0.203 | 0 | 4.77 | 107 |
| B-2 | 0.500 | 0.200 | 0 | 4.78 | 79 |
| B-4 | 0.299 | 0.397 | 0 | 4.81 | 50 |
| B-5 | 0.505 | 0.505 | 0 | 4.82 | 83 |
| B-6 | 0.700 | 0.098 | 0 | 6.40 | 106 |
| B-8 | 0.900 | 0.051 | 0 | 7.62 | 132 |
| L-I | 0.020 | 0.300 | 0 | 4.90 | 11 |
| C-2-1A | 0.020 | 0.080 | 0 | 5.09 | 5 |
| C-2-1B | 0.100 | 0.080 | 0 | 5.20 | 19 |
| C-2-1C | 0.050 | 0.080 | 0 | 5.01 | 8 |
| C-2-1D | 0.071 | 0.081 | 0 | 5.13 | 14 |
| C-4-1A | 0.500 | 0.081 | 0 | 6.46 | 79 |
| C-4-1B | 0.899 | 0.082 | 0 | 7.16 | 105 |
| H-1A | 0.400 | 0.400 | 0 | 4.93 | 78 |
| H-3 | 0.300 | 0.300 | 0 | 4.95 | 55 |
| H-4A | 0.040 | 0.200 | 0 | 4.90 | 13 |

The hypochlorous acid water preparation agent according to example 1 may have a sodium chloride (element i) content A (gw) satisfying 0.07≤A≤0.5 relative to 300 mL of solvent water, and a sodium diacetate (element ii) content X (gw) satisfying 0.08≤X.

When the hypochlorous acid water preparation agent according to example 1 has a sodium chloride (element i) content A (gw)<0.07, the electrolyzed solution cannot have a free residual chlorine concentration greater than or equal to 10 ppm. This is based on the test results of samples C-2-1C and C-2-1D in table 1. The free residual chlorine concentration in the electrolyzed solution increases as the sodium chloride (element i) content A increases.

Without sodium diacetate (element ii), the electrolyzed solution cannot have a pH value lower than or equal to 6.5. This is based on the test results of samples S-1, S-2, and S-3 in table 1. Thus, the hypochlorous acid water preparation agent according to example 1 essentially contains element ii, which is sodium diacetate.

When the hypochlorous acid water preparation agent according to example 1 has a sodium diacetate (element ii) content X (gw)>0.08 and a sodium chloride (element i) content A (gw)>0.5, the electrolyzed solution cannot have a pH value lower than or equal to 6.5. This is based on the test results of samples C-2-1A, C-2-1B, C-2-1C, C-2-1D, C-4-1A, and C-4-1B in table 1.

Although an increase in the sodium diacetate (element ii) content X (gw) of the hypochlorous acid water preparation agent according to example 1 has no negative effect on the pH of the electrolyzed solution, a higher content X of element ii increases the cost of producing the hypochlorous acid water preparation agent according to example 1. Thus, an excess amount of element ii in the hypochlorous acid water preparation agent according to example 1 may not be advantageous.

The hypochlorous acid water preparation agent according to example 1 with its element contents specified as described above is dissolved in 300 mL of water. This solution is electrolyzed to produce hypochlorous acid water. The hypochlorous acid water has a free residual chlorine concentration within the range of about 10 to 120 ppm.

In this case, the hypochlorous acid water prepared with the hypochlorous acid water preparation agent according to example 1 can be used without concern, without dilution.

In addition, the hypochlorous acid water prepared with the hypochlorous acid water preparation agent according to example 1 may have a pH value within the range of 4.5 to 6.5.

This electrolyzed solution may contain at least 90 mol % of hypochlorous acid (HClO), which provides beneficial sterilizing and deodorizing effects to the hypochlorous acid water.

In addition, when the hypochlorous acid water prepared with the hypochlorous acid water preparation agent according to example 1 has a pH value within the range of 4.5 to 5.5, the electrolyzed solution may contain nearly 100 mol % of hypochlorous acid (HclO). This further increases the sterilizing and deodorizing effects of the hypochlorous acid water.

As described above, an increase in the sodium diacetate (element ii) content of the hypochlorous acid water preparation agent according to example 1 has no negative effect on the pH or the free residual chlorine concentration of the electrolyzed solution. Thus, element ii is usable as a filler or an excipient for the hypochlorous acid water preparation agent according to example 1. In this case, the hypochlorous acid water preparation agent according to example 1 can be handled more easily.

4-2: Element Contents of Hypochlorous Acid Water Preparation Agent According to Example Table 2 below shows the measurement results of the pH values and the free residual chlorine concentrations of electrolyzed solutions obtained by electrolyzing electrolytic solutions containing varying amounts of sodium chloride as element i, sodium diacetate as element ii, and sodium hydrogencarbonate (baking soda) as element iii.

The samples and the devices used in the tests shown in table 2 are specified below. As described above, in each electrolyzed solution prepared with the hypochlorous acid water preparation agent according to example 2, theoretically all the residual chlorine is free residual chlorine. Thus, each value expressed in ppm in table 2 is substantially the sum of two concentrations of hypochlorous acid (HclO) and hypochlorite ions (ClO⁻).

Water: tap water (test site: Hong Kong) 300 mL/sample
Element i (sodium chloride): Shokutakuen (table salt) manufactured by The Salt Industry Center of Japan
Element ii (sodium diacetate): Sodium Diacetate manufactured by FUJIFILM Wako Pure Chemical Corporation
Element iii (sodium hydrogencarbonate): ARM & HAMMER Baking Soda manufactured by Church & Dwight Co., Inc.
Electrolytic device: Clean-Jug manufactured by Momax Technology Ltd. (MOMAX)
Electrolytic cell type: membraneless
Power consumption: 17.5±1 W
Current: 165 mA
Electrolytic cell volume: 300 mL
Electrolysis time (current passing time): 3 min
Balance used to weigh elements: GX-200 manufactured by A&D Company, Limited
pH meter: edge HI 2002-01 (pH-only) manufactured by Hanna Instruments JAPAN
Measuring instrument used to measure free residual chlorine concentrations: Ultra High Range Chlorine Portable Photometer—HI96771 (ultrahigh concentration for all free chlorine/low concentration for free chlorine) manufactured by Hanna Instruments JAPAN

TABLE 2

| Sample | Element i Sodium chloride (gw) | Element ii Sodium diacetate (gw) | Element iii Sodium hydrogen-carbonate (gw) | pH after electrolysis | Free residual chlorine concentration (ppm) |
|---|---|---|---|---|---|
| A-1 | 0.529 | 0.205 | 0.306 | 6.63 | 100 |
| A-2 | 0.515 | 0.222 | 0.053 | 5.65 | 85 |
| A-3 | 0.514 | 0.209 | 0.026 | 5.32 | 80 |
| A-4 | 0.518 | 0.212 | 0.012 | 5.13 | 81 |
| A-5 | 0.511 | 0.302 | 0.208 | 6.53 | 93 |
| A-6 | 0.515 | 0.314 | 0.100 | 5.74 | 82 |
| A-7 | 0.502 | 0.312 | 0.323 | 6.83 | 79 |
| A-8 | 0.499 | 0.207 | 0.202 | 6.93 | 95 |
| A-9 | 0.509 | 0.101 | 0.105 | 7.29 | 88 |
| A-10 | 0.514 | 0.198 | 0.099 | 6.47 | 91 |
| A-11 | 0.501 | 0.201 | 0.099 | 6.63 | 103 |
| A-12 | 0.506 | 0.251 | 0.152 | 6.53 | 108 |
| EX-1 | 0.504 | 3.002 | 0.300 | 4.96 | 93 |
| EX-2 | 0.515 | 2.996 | 2.054 | 6.42 | 69 |
| EX-3 | 0.5 | 1.499 | 1.000 | 6.27 | 82 |
| M-1 | 0.501 | 0.151 | 0.084 | 7.04 | NA |
| M-2 | 0.505 | 0.148 | 0.053 | 6.45 | 95 |
| M-3 | 0.302 | 0.081 | 0.054 | 6.86 | 53 |
| M-4 | 0.294 | 0.081 | 0.047 | 6.83 | NA |
| M-5 | 0.300 | 0.080 | 0.031 | 6.62 | 50 |
| M-6 | 0.302 | 0.080 | 0.020 | 6.40 | 54 |
| F-1 | 0.510 | 0.209 | 0.011 | 5.28 | 81 |
| F-2 | 0.500 | 0.302 | 0.010 | 4.95 | 72 |
| F-3 | 0.503 | 0.404 | 0.012 | 4.92 | 77 |
| F-4 | 0.306 | 0.203 | 0.012 | 5.21 | 46 |
| F-5 | 0.303 | 0.301 | 0.009 | 4.91 | 52 |
| F-6 | 0.308 | 0.398 | 0.010 | 4.87 | 44 |
| F-7 | 0.397 | 0.301 | 0.012 | 4.96 | 65 |
| F-8-1 | 0.400 | 0.402 | 0.010 | 4.80 | 70 |
| F-8-2 | 0.404 | 0.404 | 0.011 | 4.82 | 87 |
| F-9 | 0.602 | 0.300 | 0.011 | 5.06 | 98 |
| C-1 | 0.481 | 0.045 | 0.012 | 7.57 | 73 |
| H-1 | 0.400 | 0.400 | 0.010 | 4.96 | 78 |
| H-1B | 0.400 | 0.400 | 0.050 | 5.14 | 76 |
| H-2 | 0.300 | 0.400 | 0.050 | 5.11 | 56 |
| H-4 | 0.040 | 0.200 | 0.010 | 4.97 | 13 |
| H-4B | 0.040 | 0.200 | 0.050 | 5.34 | 11 |

TABLE 2-continued

| Sample | Element i Sodium chloride (gw) | Element ii Sodium diacetate (gw) | Element iii Sodium hydrogen-carbonate (gw) | pH after elec-trol-ysis | Free residual chlorine concen-tration (ppm) |
|---|---|---|---|---|---|
| H-5 | 0.600 | 0.400 | 0.010 | 5.02 | 105 |
| H-6 | 0.300 | 0.200 | 0.100 | 6.24 | 64 |

The test results in table 2 obtained with varying sodium hydrogencarbonate (element iii) contents and a fixed sodium diacetate (element ii) content have revealed that the pH value of the electrolyzed solution increases as the amount of element iii increases. In other words, the alkalinity of the electrolyzed solution tends to increase as the amount of element iii increases.

The test results in table 2 obtained with varying sodium hydrogencarbonate (element iii) contents and a fixed sodium diacetate (element ii) content have revealed that the pH value of the electrolyzed solution increases as the amount of element iii increases. In other words, the alkalinity of the electrolyzed solution tends to increase as the amount of element iii increases.

To identify the upper limit of the amount of element iii, the test results in table 2 for electrolyzed solutions having pH values approximate to 6.5 are determined, and their sodium diacetate (element ii) contents and corresponding sodium hydrogencarbonate (element iii) contents are plotted in a two-dimensional graph.

FIG. 1 is the two-dimensional graph showing the test results for the electrolyzed solutions having pH values approximate to 6.5 extracted from table 2 and plotted with the sodium diacetate (element ii) contents (gw) on the X-axis and the sodium hydrogencarbonate (element iii) contents (gw) on the Y-axis.

The hypochlorous acid water preparation agent according to example 2 may have a sodium chloride (element i) content A (gw) satisfying $0.07 \leq A \leq 0.5$ relative to 300 mL of solvent water, and a sodium hydrogencarbonate content Y (gw) satisfying $Y \leq 0.67X$ for a sodium diacetate (element ii) content X (gw) satisfying $0.3 \leq X$. This is based on FIGS. 1 and 2 and the test results of samples A-5, EX-2, and EX-3 in table 2.

Additionally, the hypochlorous acid water preparation agent according to example 2 may have a sodium chloride (element i) content A (gw) satisfying $0.07 \leq A \leq 0.5$ relative to 300 mL of solvent water, and a sodium hydrogencarbonate content Y (gw) satisfying $Y \leq (X-0.1)$ for a sodium diacetate (element ii) content X (gw) satisfying $0.15 \leq X < 0.3$. This is based on FIGS. 1 and 2 and the test results of samples A-5, A-12, A-10, and M-2 in table 2.

In addition, the hypochlorous acid water preparation agent according to example 2 may have a sodium chloride (element i) content A (gw) satisfying $0.07 \leq A \leq 0.3$ relative to 300 mL of solvent water, and a sodium hydrogencarbonate content Y (gw) satisfying $Y \leq (0.43X-0.014)$ for a sodium diacetate (element ii) content X (gw) satisfying $0.08 \leq X < 0.15$. This is based on FIGS. 1 and 2 and the test results of samples M-2 and M-6 in table 2.

The hypochlorous acid water preparation agent according to example 2 with its element contents specified as described above is dissolved in 300 mL of water. This solution is electrolyzed to produce electrolyzed solution. The electrolyzed solution has a free residual chlorine concentration within the range of about 10 to 70 ppm.

In this case, the hypochlorous acid water prepared with the hypochlorous acid water preparation agent according to example 2 can be used without concern, without dilution.

In addition, the hypochlorous acid water prepared with the hypochlorous acid water preparation agent according to example 2 may have a pH value within the range of 4.5 to 6.5.

This electrolyzed solution may contain at least 90 mol % of hypochlorous acid (HClO), which provides beneficial sterilizing and deodorizing effects to the hypochlorous acid water.

In addition, when the hypochlorous acid water prepared with the hypochlorous acid water preparation agent according to example 2 has a pH value within the range of 4.5 to 5.5, the electrolyzed solution may contain nearly 100 mol % of hypochlorous acid (HClO).

More specifically, when the hypochlorous acid water preparation agent according to example 2 has a sodium chloride (element i) content A (gw) satisfying $0.07 \leq A \leq 0.5$, a sodium diacetate (element ii) content X (gw) satisfying $0.2 \leq X$, and a sodium hydrogencarbonate content Y (gw) satisfying $Y \leq 0.05$ relative to 300 mL of solvent water, the electrolyzed solution may have a pH value near 5. This is based on the test results of samples A-3, A-4, F-1 to F-7, F-8-1, F-8-2, H-1 to H-5, H-1B, and H-4B in table 2.

This further increases the sterilizing and deodorizing effects of the hypochlorous acid water.

Additionally, when the hypochlorous acid water preparation agent according to example 2 particularly in tablet form is placed into water, the sodium hydrogencarbonate contained as element iii in the hypochlorous acid water preparation agent according to example 2 can smoothly dissolve each element. The smooth dissolution can greatly reduce the time taken to prepare hypochlorous acid water with the hypochlorous acid water preparation agent according to example 2 in tablet form.

In addition, the hypochlorous acid water preparation agent according to example 2 allows the pH value of the electrolyzed solution to easily become equal or approximate to a specified value within the range of 4.5 to 6.5 by adjusting the sodium diacetate (element ii) content and the sodium hydrogencarbonate (element iii) content within the above ranges as appropriate.

More specifically, comparison between sample F-4 and sample H-6 in table 2 shows that the samples contain different amounts of sodium hydrogencarbonate (element iii) although containing similar amounts of element i and similar amounts of element ii. The comparison between sample F-4 and sample H-6 also shows that the pH value of the electrolyzed solution produced with sample H-6 is higher than with sample F-4. The electrolysis times for samples F-4 and H-6 in table 2 are both three minutes. Thus, the hypochlorous acid water preparation agent according to example 2 allows the pH value of the electrolyzed solution to be adjusted as intended by simply adjusting the sodium hydrogencarbonate (element iii) content without changing the electrolysis time or the current passing rate for electrolysis as appropriate.

This facilitates preparation of hypochlorous acid water having a pH value and a free residual chlorine concentration intended by the user. Thus, the hypochlorous acid water preparation agent according to example 2 is more convenient than the hypochlorous acid water preparation agent according to example 1.

An increase in the sodium diacetate (element ii) content of the hypochlorous acid water preparation agent according to example 2 has no negative effect on the pH or the free residual chlorine concentration of the electrolyzed solution. Thus, element ii is usable as a filler or an excipient for the hypochlorous acid water preparation agent according to example 2. In this case, the hypochlorous acid water preparation agent according to example 2 can be handled more easily.

Element iii of the hypochlorous acid water preparation agent according to example 2, or sodium hydrogencarbonate, does not affect fluctuations in the concentration of free residual chlorine in the electrolyzed solution. This is based on the test results of sample H-1A in table 1, sample H-1B in table 2, sample H-4A in table 1, and sample H-4B in table 2. Samples H-1A and H-1B were tested under the same conditions except the amounts of element iii, and samples H-4A and H-4B were also tested under the same conditions except the amounts of element iii. More specifically, for samples H-1A and H-1B, after doubling of an electrolytic solution containing elements i and ii in the quantities indicated in table 1 or table 2, the resultant prepared electrolytic solution was divided into two halves. One half of the solution then contains sodium hydrogencarbonate added as element iii in the quantity indicated in table 2 to provide sample H-1B. The other half of the solution contains no element iii added to provide sample H-1A. Then, each electrolytic solution was electrolyzed. Samples H-4A and H-4B were prepared similarly to samples H-1A and H-1B.

Thus, when the hypochlorous acid water preparation agent according to example 2 is used, the electrolyzed solution, or the hypochlorous acid water, has a free residual chlorine concentration that depends on the sodium chloride (element i) content.

5: Hypochlorous Acid Water Prepared with Hypochlorous Acid Water Preparation Agent According to Present Embodiment Changes in free residual chlorine concentrations in hypochlorous acid water prepared with the hypochlorous acid water preparation agent according to the present embodiment will now be described.

Figure 3:
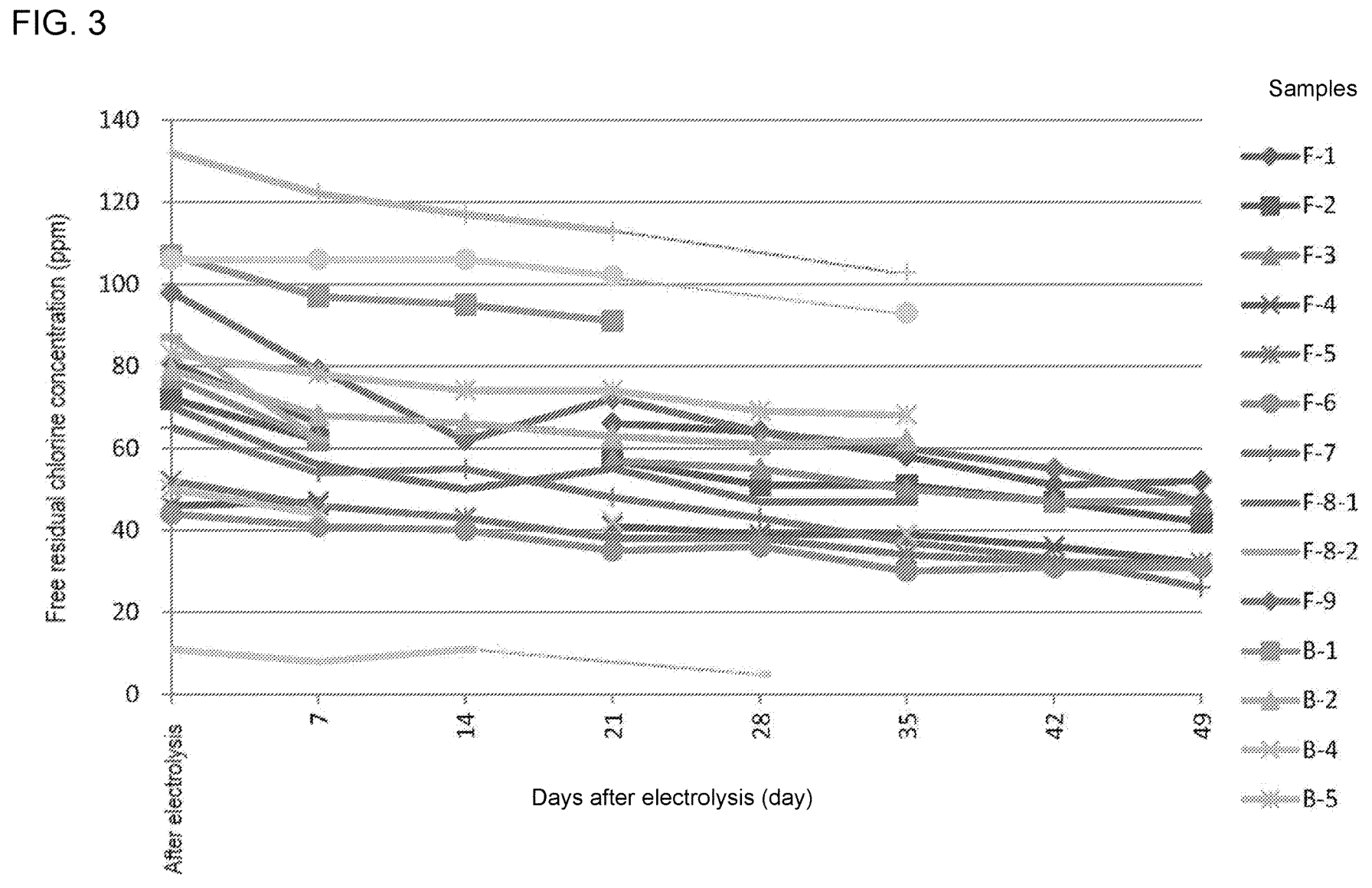

FIG. 3 is a graph showing free residual chlorine concentrations that change over time after electrolysis of several samples in tables 1 and 2. The hypochlorous acid water prepared with the hypochlorous acid water preparation agent according to the present embodiment was transferred into a transparent plastic bottle and stored in a room out of direct sunlight at room temperature without blocking light.

As shown in FIG. 3, every free residual chlorine concentration in hypochlorous acid water prepared with the hypochlorous acid water preparation agent according to the present embodiment tends to decrease gradually over time after the electrolysis.

Thus, the hypochlorous acid water prepared with the hypochlorous acid water preparation agent according to the present embodiment is to be used readily after the electrolysis.

6: Details of Embodiment of Present Invention

6-1: Hypochlorous Acid Water Preparation Package According to Embodiment of Present Invention The hypochlorous acid water preparation package according to one or more embodiments of the present invention will now be described with reference to FIGS. 4A to 5B.

Figures 5A, 5B:
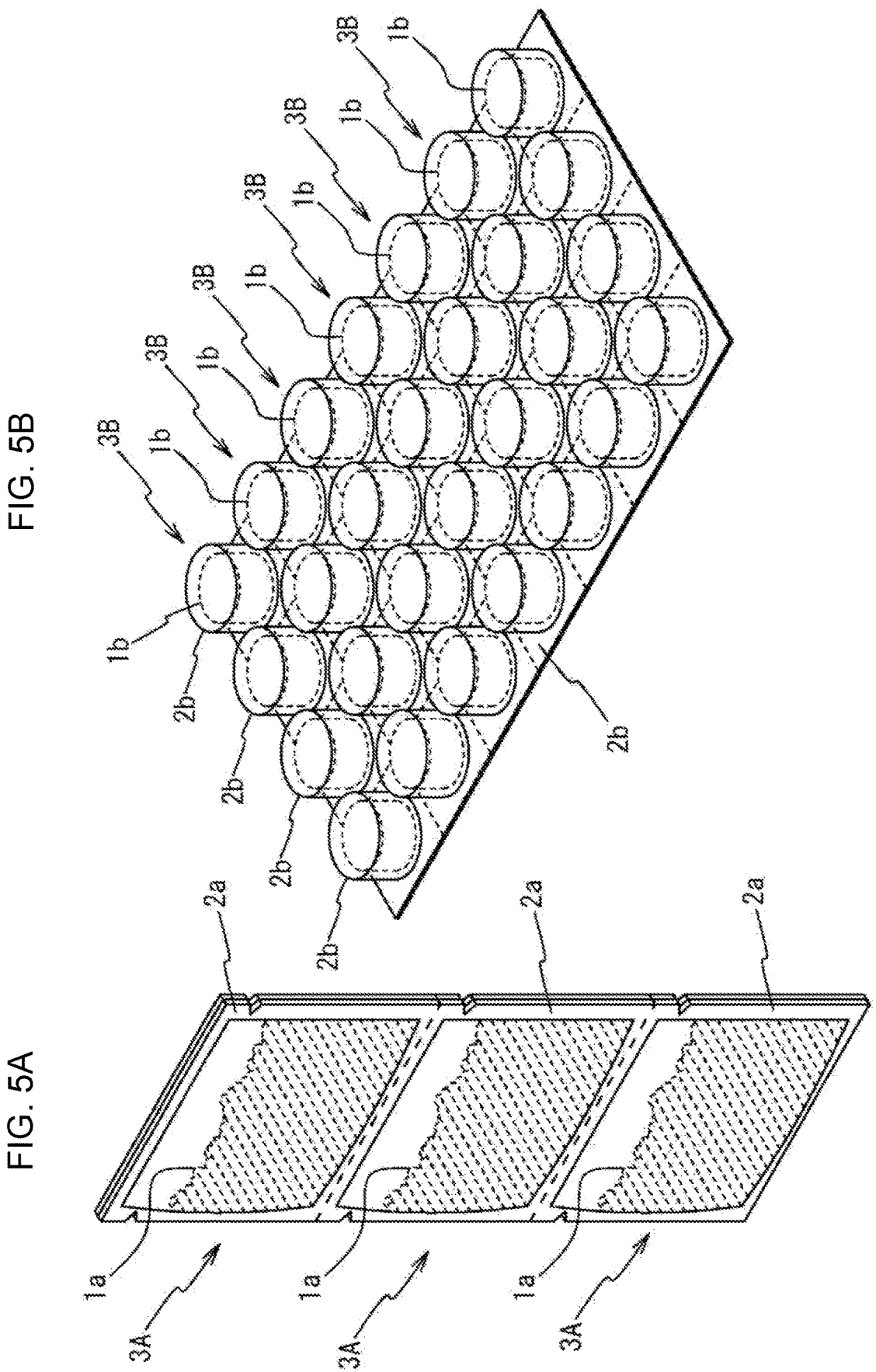
FIGS. 5A and 5B are schematic diagrams each showing hypochlorous acid water preparation packages in another form according to one or more embodiments of the present invention.

FIGS. 4A and 4B are schematic diagrams each showing a hypochlorous acid water preparation package according to one or more embodiments of the present invention. FIGS. 5A and 5B are schematic diagrams each showing hypochlorous acid water preparation packages in another form according to one or more embodiments of the present invention.

The hypochlorous acid water preparation agent according to the present embodiment, or the hypochlorous acid water preparation agent according to example 1 or 2, may be powder 1a as shown in FIG. 4A or particles or granules that are not shown.

In other cases, the hypochlorous acid water preparation agent according to the present embodiment may be, as shown in FIG. 4B, a tablet 1b formed by tableting the elements.

As described above, the hypochlorous acid water preparation agent according to the present embodiment that is the powder 1a (particles or granules) or the tablet 1b may be measured and divided into specified quantities for storage. This storage is convenient because, each time preparing hypochlorous acid water, the user does not measure out an intended amount of hypochlorous acid water preparation agent according to the present embodiment.

In addition, the hypochlorous acid water preparation agent according to the present embodiment that is the powder 1a (particles or granules) or the tablet 1b may be, as shown in FIGS. 4A and 4B, sealed in a hermetic container 2a or 2b and provided as a hypochlorous acid water preparation package 3A or 3B. This is not essential but optional.

During storage of the hypochlorous acid water preparation agent according to the present embodiment, the package prevents the constituents of the agent from absorbing moisture, thus preventing the constituents from reacting with moisture and being lost and a part of the constituents from flowing out with moisture.

This prevents variations in the quality, or the free residual chlorine concentration and the pH value, of the hypochlorous acid water prepared with the hypochlorous acid water preparation agent according to the present embodiment.

Thus, the hypochlorous acid water preparation packages 3A and 3B according to one or more embodiments of the present invention shown in FIGS. 4A and 4B improve the stability of the quality of the hypochlorous acid water preparation agent during storage.

FIGS. 4A and 4B illustrate the separate hypochlorous acid water preparation packages 3A and 3B according to one or more embodiments of the present invention. However, as illustrated in FIGS. 5A and 5B, multiple hypochlorous acid water preparation packages 3A or hypochlorous acid water preparation packages 3B may be assembled and provided as a single sheet. This is not essential but optional.

In this case, the hypochlorous acid water preparation packages 3A or 3B according to one or more embodiments of the present invention can be provided as a compact article.

This allows the hypochlorous acid water preparation packages 3A or 3B according to one or more embodiments of the present invention to be delivered or stored more easily.

6-2: Electrolytic Device for Preparing Hypochlorous Acid Water

An example electrolytic device used to prepare hypochlorous acid water with the hypochlorous acid water preparation agent according to the present embodiment will now be described with reference to FIGS. 6 to 8.

Figure 6:
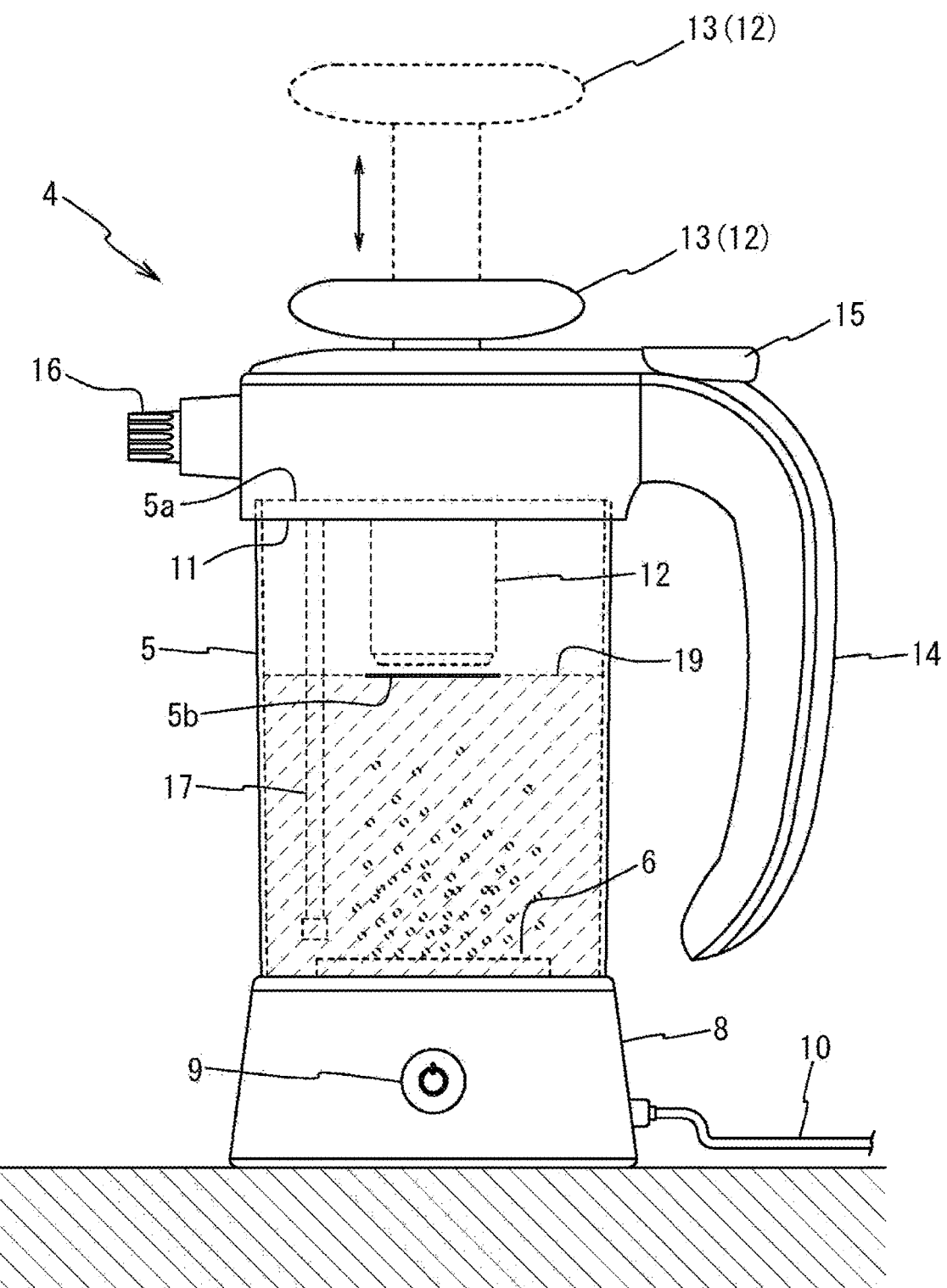
FIG. 6 is a side view of an example electrolytic device used to prepare hypochlorous acid water with a hypochlorous acid water preparation agent according to an embodiment of the present invention.
Figure 8A:
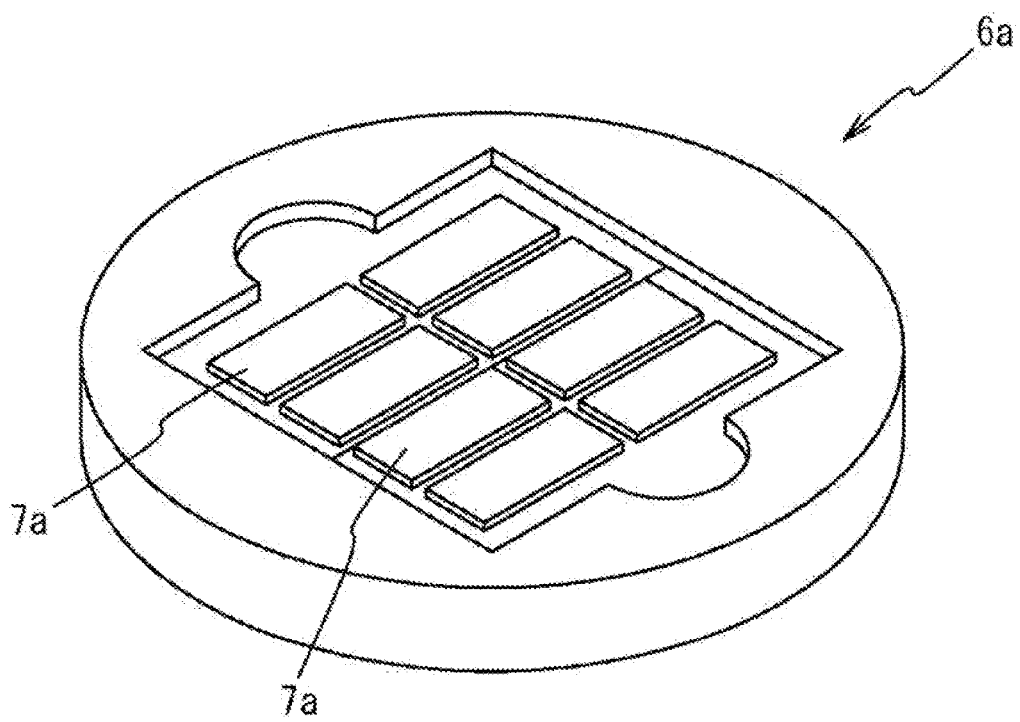
FIGS. 8A and 8B are partial perspective views of an example electrode unit included in the electrolytic device shown in FIGS. 6 and 7.
Figure 8B:
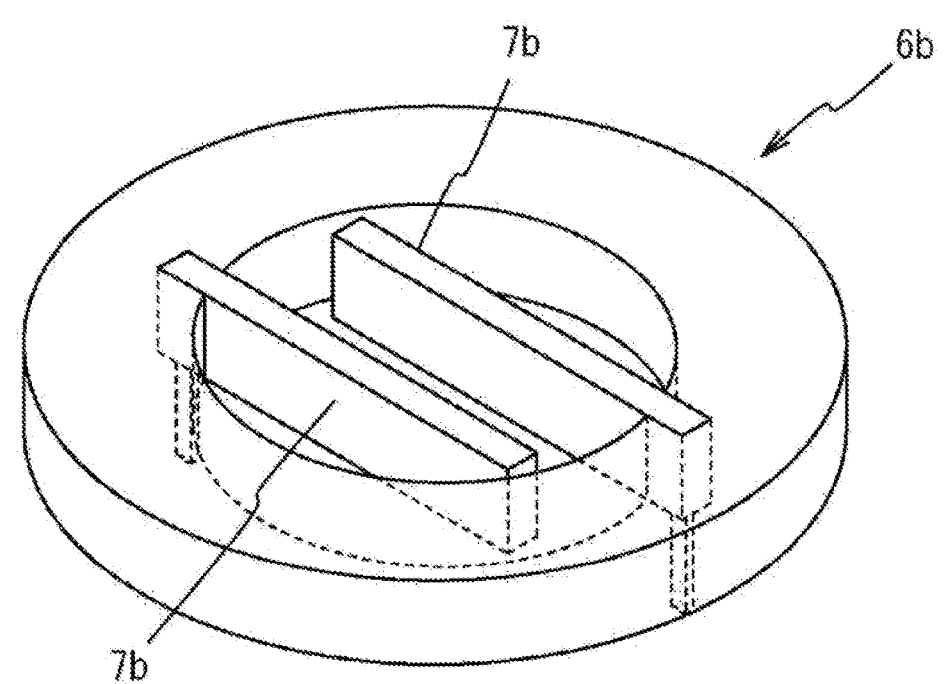

FIG. 6 is a side view of an example electrolytic device used to prepare hypochlorous acid water with the hypochlorous acid water preparation agent according to the embodiment of the present invention. FIG. 7 is an exploded side view of the electrolytic device. FIGS. 8A and 8B are partial perspective views of an example electrode unit included in the electrolytic device shown in FIGS. 6 and 7. The components that are also shown in FIGS. 1 to 5 are given the same reference numerals, and will not be described repeatedly.

Figure 7:
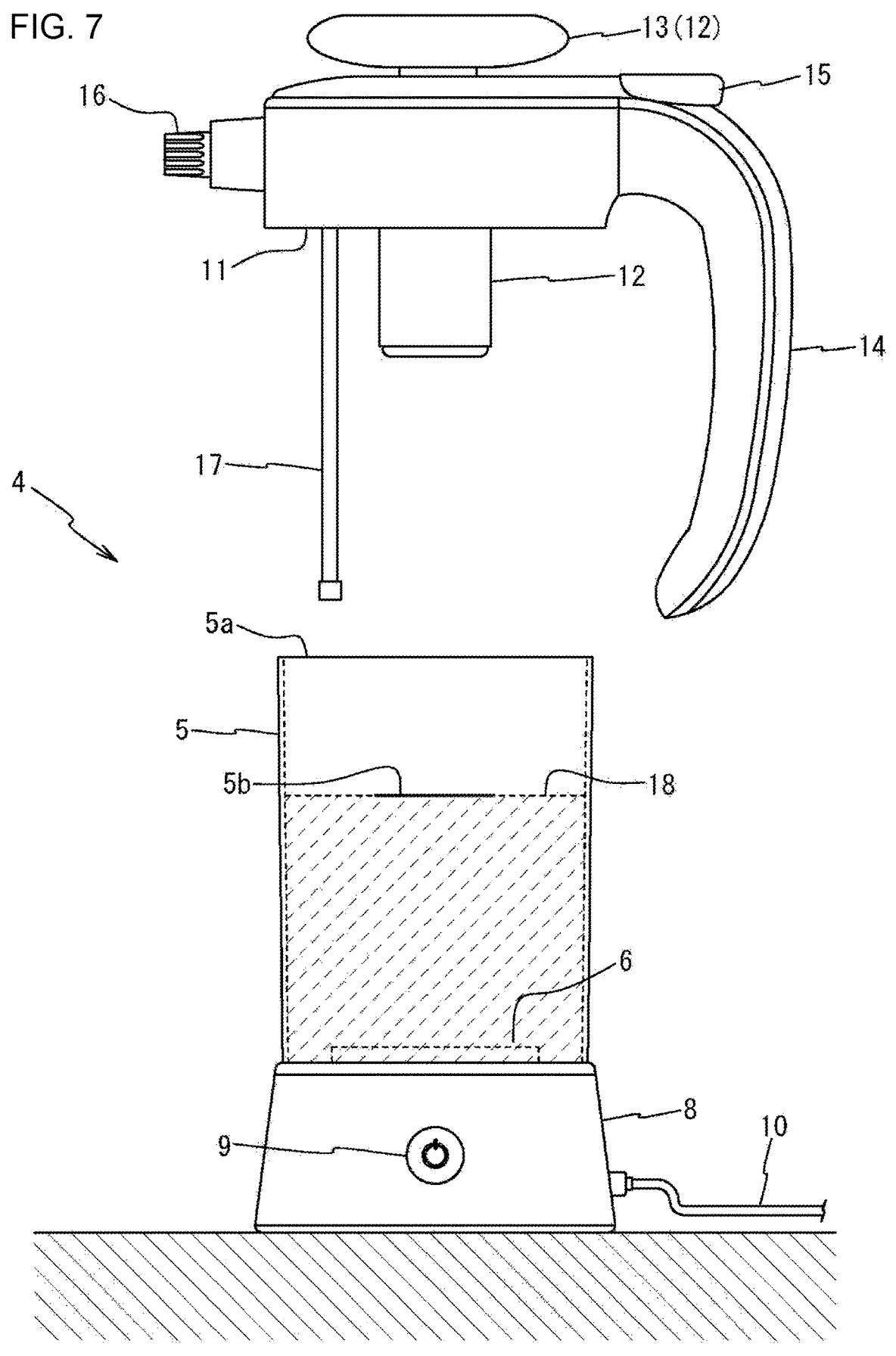

An electrolytic device 4 used to prepare hypochlorous acid water with the hypochlorous acid water preparation agent according to the present embodiment may include, for example, as shown in FIGS. 6 and 7, a container 5 that is a diaphragmless electrolytic cell and stores an electrolytic solution, an output controller 8 that includes a housing facing the bottom of the container 5 and inner components inside the housing, a power cord 10 that feeds the output controller 8 with electric power, a switch 9 that is provided on the side surface of the output controller 8 and activates the output controller 8, and an electrode unit 6 installed on the bottom surface of the container 5. Although not shown, the output controller 8 includes a timer that controls the current passing time for the electrode unit 6.

With the container 5 storing an electrolytic solution obtained by dissolving the hypochlorous acid water preparation agent according to the present embodiment in water, the electrolytic device 4 can electrolyze the electrolytic solution when the user simply turns on the switch 9 to activate the electrolytic device 4. The electrolysis of the electrolytic solution produces hypochlorous acid water.

The container 5 in the electrolytic device 4 may be formed from a light-transmissive material and have a water level line 5b drawn on the side surface to indicate the amount of water supplied, for example, as shown in FIGS. 6 and 7. This is not essential but optional.

In this case, after a specified amount, or more specifically, for example, 300 mL of water is placed in the container 5, the hypochlorous acid water preparation agent according to the present embodiment, or the hypochlorous acid water preparation agent according to example 1 or 2, can be simply added to the water to produce an electrolytic solution to be electrolyzed.

In addition to the above components, for example, as shown in FIGS. 6 and 7, the above electrolytic device 4 may include, as appropriate, an upper lid 11 that covers an opening 5a of the container 5, and a handle 14 protruding from the side surface of the upper lid 11. This is not essential but optional.

In this case, the handle 14 is gripped to easily carry the electrolytic device 4. Additionally, the upper lid 11 for the electrolytic device 4 prevents an electrolytic solution during electrolysis or hypochlorous acid water, which is an electrolyzed solution, from escaping from the container 5.

In addition to the above components, for example, as shown in FIGS. 6 and 7, the above electrolytic device 4 may further include, in the upper lid 11 as appropriate, a pump 12 and an operation unit 13 that feed air into the container 5, a spray nozzle 16, a suction nozzle 17, and an ejection switch 15. This is not essential but optional.

In this case, after an electrolytic solution is electrolyzed in the container 5 in the electrolytic device 4, the operation unit 13 for the pump 12 installed in the upper lid 11 may be moved up and down in a vertical direction to feed air into the container 5, increasing the pressure within the container 5.

Then, the user may operate the ejection switch 15 to draw up hypochlorous acid water 19 stored in the container 5 into the suction nozzle 17 and eject the drawn water from the spray nozzle 16.

The hypochlorous acid water 19 obtained by electrolysis in the electrolytic device 4 can be used directly from the container 5 without transferring the water into another spray.

The electrode unit 6 installed in the container 5 of the electrolytic device 4 shown in FIGS. 6 and 7 may be, for example, as shown in FIG. 8A, an electrode unit 6a in which several rectangular electrode plates 7a are arranged horizontally, or for example, as shown in FIG. 8B, an electrode unit 6b in which rectangular electrode plates 7b are arranged upright.

The electrode unit 6 in the electrolytic device 4 may not be limited to the illustrated arrangements but may have any arrangement that can pass an electric current through an electrolytic solution and be washed and used repeatedly.

6-3: Modification of Electrolytic Device for Preparing Hypochlorous Acid Water A modification of the above electrolytic device 4 will now be described with reference to FIGS. 9 and 10.

Figure 9:
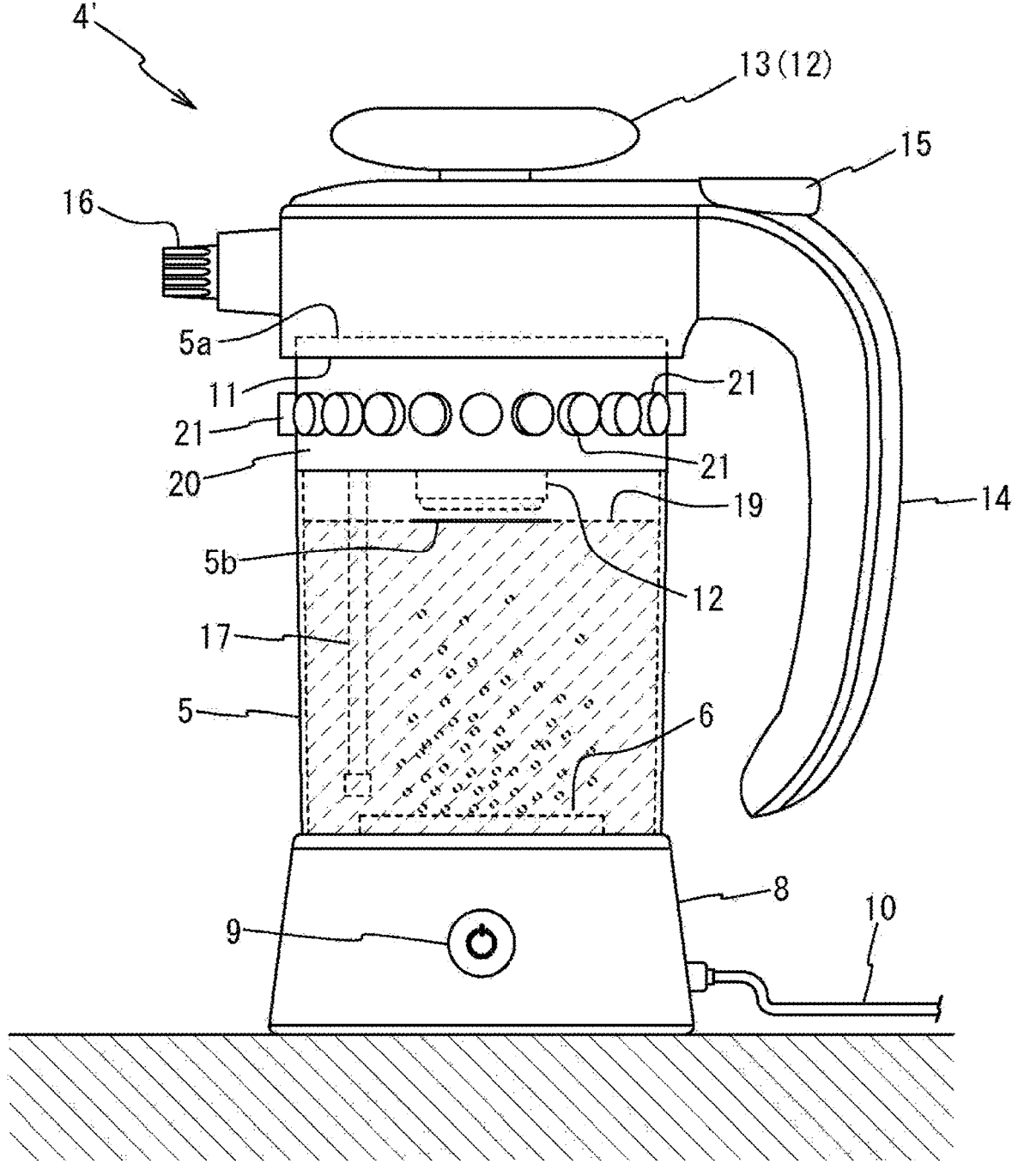
FIG. 9 is a side view of another example electrolytic device used to prepare hypochlorous acid water with the hypochlorous acid water preparation agent according to the embodiment of the present invention.
Figure 10:
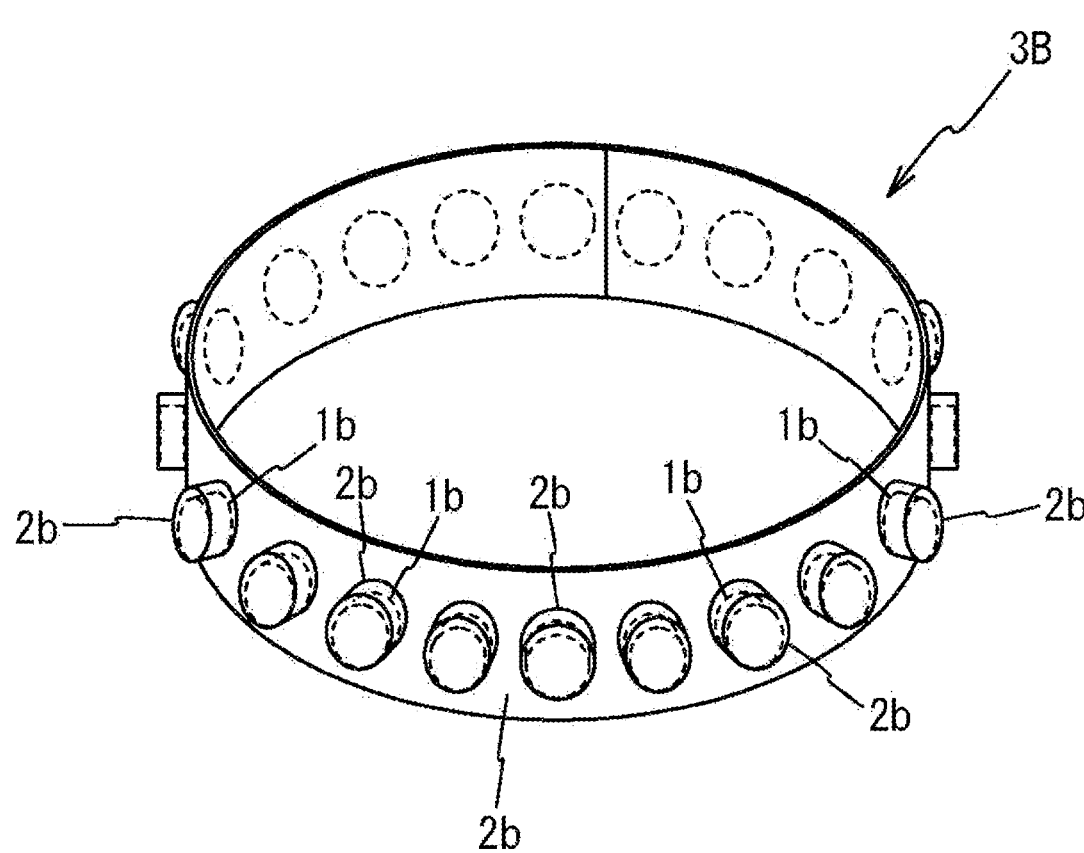
FIG. 10 is a perspective view of a hypochlorous acid water preparation package used for the electrolytic device shown in FIG. 9.

FIG. 9 is a side view of another example electrolytic device used to prepare hypochlorous acid water with the hypochlorous acid water preparation agent according to the embodiment of the present invention. FIG. 10 is a perspective view of a hypochlorous acid water preparation package used for the electrolytic device shown in FIG. 9. The components that are also shown in FIGS. 1 to 8 are given the same reference numerals, and will not be described repeatedly.

An electrolytic device 4' in another example may include, for example, as shown in FIG. 9, a tablet holder 20 near the opening 5a of the container 5 to hold a strip cut from the hypochlorous acid water preparation packages 3B shown in FIG. 5B. This is not essential but optional.

The strip cut from the hypochlorous acid water preparation packages 3B shown in FIG. 5B, or a press-through pack (PTP) sheet, can be fitted into the tablet holder 20 from the inside.

Although not shown, the hypochlorous acid water preparation package 3B fitted in the tablet holder 20 is fixed by a support that can hold the hypochlorous acid water preparation package 3B from inside the container 5.

For the electrolytic device 4' in the other example, when a projection 21 protruding from the tablet holder 20 is pushed inward from outside the container 5, the container 5 receives the corresponding one of the hypochlorous acid water preparation agents having the form of, for example, the tablet 1b and individually stored in the hypochlorous acid water preparation package 3B.

The electrolytic device 4' in the other example allows the hypochlorous acid water preparation package 3B according to one or more embodiments of the present invention to be preset in the electrolytic device 4'.

More specifically, for the electrolytic device 4' in the above modification, the hypochlorous acid water preparation package 3B is set in the electrolytic device 4' constantly, thus eliminating locating the hypochlorous acid water preparation package 3B each time hypochlorous acid water is prepared.

Thus, the electrolytic device 4' in the other example described above allows the user to prepare hypochlorous acid water as appropriate easily and quickly with the hypochlorous acid water preparation package 3B according to one or more embodiments of the present invention.

6-4: Hypochlorous Acid Water Production Method According to Embodiment of Present Invention Finally, a hypochlorous acid water production method with the hypochlorous acid water preparation agent according to the present embodiment will now be described with reference to FIGS. 6, 7, and 11.

Figure 11:
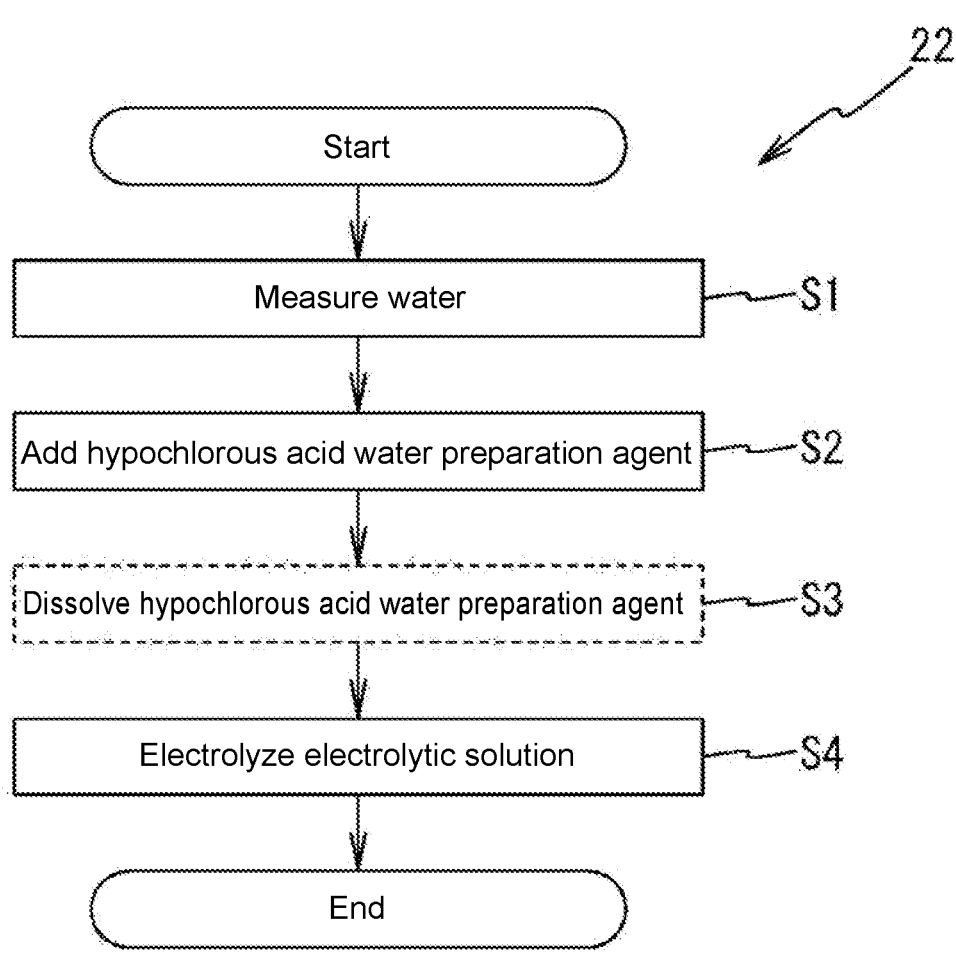
FIG. 11 is a flowchart showing a process for preparing hypochlorous acid water with the hypochlorous acid water preparation agent according to the embodiment of the present invention.

FIG. 11 is a flowchart showing a process for preparing hypochlorous acid water with the hypochlorous acid water preparation agent according to the embodiment of the present invention. The components that are also shown in FIGS. 1 to 10 are given the same reference numerals, and will not be described repeatedly.

To prepare hypochlorous acid water with the hypochlorous acid water preparation agent according to the present embodiment, or more specifically, the hypochlorous acid water preparation agent according to example 1 or the hypochlorous acid water preparation agent according to example 2, for example, first, the electrolytic device 4 including the diaphragmless electrolytic cell shown in FIG. 6 is prepared, and a specified amount of water 18 (refer to FIG. 7) such as tap water or commercially available drinking water is measured and stored into the container 5 (step S1).

The hypochlorous acid water preparation agent according to the present embodiment is then added to the water stored in the container 5 (step S2).

The user waits until the hypochlorous acid water preparation agent added to the water in the container 5 is dissolved or broken in the water (step S3). The waiting time in step S3 is about one to a few minutes when the container 5 is fed with 300 mL of water. In step S3, an electrolytic solution for electrolysis is produced.

The switch 9 of the electrolytic device 4 may then be turned on to pass an electric current through the electrolytic solution stored in the container 5 to electrolyze the electrolytic solution (step S4).

For electrolysis of an electrolytic solution obtained by dissolving the hypochlorous acid water preparation agent according to the present embodiment in water, the pH of the electrolyzed solution depends on the amount of charge added to the electrolytic solution.

More specifically, as the amount of charge added to an electrolytic solution increases, the pH value of the electrolyzed solution increases, or the alkalinity of the electrolyzed solution increases.

Thus, in a hypochlorous acid water production method 22 according to one or more embodiments of the present invention, the current passing time in step S4 of FIG. 11 may be set by inversely calculating the time taken for the electrolysis based on the amount of solvent water and the element contents of the hypochlorous acid water preparation agent according to the present embodiment to cause the electrolyzed solution to have a pH value within the range of 4.5 to 6.5, specifically within the range of 4.5 to 5.5, and more specifically approximate to 5.

In the hypochlorous acid water production method 22 according to one or more embodiments of the present invention shown in FIG. 11, when the hypochlorous acid water preparation agent according to example 2 is used, simply adjusting the sodium hydrogencarbonate (element iii) content within the above range allows fine adjustment of the pH of the electrolyzed solution without changing the current passing time for the electrolytic solution.

More specifically, although the current passing rate or the current passing time of the electrolytic device cannot be changed, the hypochlorous acid water preparation agent according to example 2 allows production of hypochlorous acid water having a pH value equal or approximate to the intended value by simply adjusting the sodium hydrogencarbonate (element iii) content as appropriate within the range indicated in 4-2: Element Contents of Hypochlorous Acid Water Preparation Agent According to Example 2.

7: Impurities in Hypochlorous Acid Water Preparation Agent According to Present Embodiment The hypochlorous acid water preparation agent according to example 1 consists of sodium chloride as element i and sodium diacetate as element ii. The hypochlorous acid water preparation agent according to example 2 consists of elements i and ii, and sodium hydrogencarbonate as element iii. However, the hypochlorous acid water preparation agent according to example 1 or 2 may be contaminated with unintended impurities in the production processes.

More specifically, when the hypochlorous acid water preparation agent according to example 1 or 2 is produced, elements i and ii or elements i, ii, and iii are mixed while being ground under dry conditions, and thus a fragment from the container or other tools may be mixed as impurities.

When the hypochlorous acid water preparation agent according to example 1 or 2 is particularly in tablet form, the elements are ground and mixed under dry conditions before being tableted. In this process, a small amount of oil may be applied to the mold to improve the releasability of the tablet, and such a component may be mixed as impurities.

In addition, when elements i, ii, and iii of the hypochlorous acid water preparation agent according to the present embodiment are produced, unavoidable impurities may be mixed.

Thus, the hypochlorous acid water preparation agent according to the present embodiment containing a trace amount of unintended impurities described above also falls within the technical scope of the present invention.

8: Results of Supplementary Tests Shown in Tables 1 and 2

Sample H-3 in table 1 and samples H-1, H-2, H-4, and H-5 in table 2 underwent supplementary tests at Hanna Instruments JAPAN. The results of the supplementary tests are shown in table 3 below. Before the supplementary tests, the Applicant, Crown Company Limited, signed a non-disclosure agreement with Hanna Instruments JAPAN.

The samples and the devices used in the tests shown in table 3 are specified below.

Water: tap water (test site: Japan) 300 mL/sample

Element i (sodium chloride): Shokutakuen (table salt) manufactured by The Salt Industry Center of Japan Element ii (sodium diacetate): Sodium Diacetate manufactured by FUJIFILM Wako Pure Chemical Corporation Element iii (sodium hydrogencarbonate): Juusou-chan (baking soda) manufactured by Kaneyo Soap Co., Ltd.

Electrolytic device: Clean-Jug manufactured by Momax Technology Ltd. (MOMAX)

Electrolytic cell type: membraneless

Power consumption: 17.5±1 W

Current: 165 mA

Electrolytic cell volume: 300 mL

Electrolysis time (current passing time): 3 min

Balance used to weigh elements: PA214CJP manufactured by OHAUS Corporation pH meter: edge HI 2002-01 (pH-only) manufactured by Hanna Instruments JAPAN Measuring instrument used to measure free residual chlorine concentrations: Ultra High Range Chlorine Portable Photometer—HI96771 (ultrahigh concentration for all free chlorine/low concentration for free chlorine) manufactured by Hanna Instruments JAPAN

TABLE 3

| Sample | Element i Sodium chloride (gw) | Element ii Sodium diacetate (gw) | Element iii Sodium hydrogencarbonate (gw) | pH after electrolysis | Free residual chlorine concentration (ppm) | Remarks |
|---|---|---|---|---|---|---|
| H-1 | 0.400 | 0.400 | 0.010 | 4.96 | 78 | Table 2 |
| HH-1 | 0.405 | 0.399 | 0.012 | 4.98 | 92 | |
| H-2 | 0.300 | 0.400 | 0.050 | 5.11 | 56 | Table 2 |
| HH-2 | 0.295 | 0.405 | 0.052 | 5.04 | 51 | |
| H-3 | 0.300 | 0.300 | 0 | 4.95 | 55 | Table 1 |
| HH-3 | 0.302 | 0.294 | 0 | 4.91 | 55 | |
| H-4 | 0.040 | 0.200 | 0.010 | 4.97 | 13 | Table 2 |
| HH-4 | 0.038 | 0.206 | 0.012 | 5.06 | 18 | |
| H-5 | 0.600 | 0.400 | 0.010 | 5.02 | 105 | Table 2 |
| HH-5 | 0.596 | 0.407 | 0.009 | 5.00 | 124 | |

The test results of sample in table 3 correspond to the test results of sample H-1 in table 2. The test results of sample HH-2 in table 3 correspond to the test results of sample H-2 in table 2. The test results of sample HH-3 in table 3 correspond to the test results of sample H-3 in table 1. The test results of sample in table 3 correspond to the test results of sample H-4 in table 2. The test results of sample HH-5 in table 3 correspond to the test results of sample H-5 in table 2.

Table 3 also includes the test results shown in tables 1 and 2 for ease of comparing the test results.

Table 3 clearly shows that the hypochlorous acid water preparation agent according to the present embodiment allows the pH value of the electrolyzed solution to be adjusted as intended with sufficient reproducibility.

9: Others

For the hypochlorous acid water preparation agent according to the present embodiment, the upper limit of the sodium chloride (element i) content A is set at 0.5 gw relative to 300 mL of solvent water, or in some cases, 0.3 gw. However, by setting the lower limit of the content X of element ii to be greater than or equal to the lower limit indicated above in 4: Element Contents, the pH value of the electrolyzed solution can be adjusted to a value within the range of 4.5 to 6.5 and specifically approximate to 5 even with the sodium chloride content A greater than 0.5 gw. This is based on the test results of samples T-2 to T-8, T-13, B-1, and B-6 in table 1, sample H-5 in table 2, and sample HH-5 in table 3.

In particular, for the hypochlorous acid water preparation agent according to example 2, by setting the upper limit of the sodium hydrogencarbonate (element iii) content Y (gw) to 95 wt % or less of the parameter indicated above in 4-2: Element Contents of Hypochlorous Acid Water Preparation Agent According to Example 2, specifically 90 wt % or less, and more specifically 80 wt % or less, the electrolyzed solution prepared with the hypochlorous acid water preparation agent according to example 2 may reliably have a pH value of 6.5 or below.

Herein, pH is an abbreviation for potential of hydrogen and stands for the hydrogen-ion concentration of a solution.

In particular, the pH value herein refers to the hydrogen ion exponent. The hydrogen ion exponent is a physical quantity representing the degree of the acidity or the alkalinity of a solution and typically expressed in the numerical range of 0 to 14. As the numerical value approaches 0, the acidity of the solution increases. In contrast, as the numerical value approaches 14, the alkalinity of the solution increases.

INDUSTRIAL APPLICABILITY

As described above, the present invention relates to a hypochlorous acid water preparation agent containing merely elements without concern for the human body, allowing hypochlorous acid water to be prepared without effort, and stored or transported easily, and also relates to a hypochlorous acid water preparation package and a hypochlorous acid water production method. These techniques are usable in technical fields including medicine, food, and sanitation.

REFERENCE SIGNS LIST 1a powder (hypochlorous acid water preparation agent)
1b tablet (hypochlorous acid water preparation agent)
2a, 2b hermetic container
3A, 3B hypochlorous acid water preparation package
4, 4' electrolytic device
5 container
5a opening
5b water level line
6, 6a, 6b electrode unit
7a, 7b electrode plate
8 output controller
9 switch
10 power cord
11 upper lid
12 pump
13 operation unit
14 handle
15 ejection switch
16 spray nozzle
17 suction nozzle
18 water
19 hypochlorous acid water
20 tablet holder
21 projection
22 hypochlorous acid water production method

The invention claimed is:

1. A hypochlorous acid water preparation agent being an additive for preparing hypochlorous acid water by electrolyzing an electrolytic solution obtained by dissolving an electrolyte in a specified amount of water, the additive consisting of:
   sodium chloride;
   sodium diacetate; and
   sodium hydrogencarbonate,
   wherein the additive is in powder form, particle form, granule form, or tablet form, and the additive is added to 300 mL of water, and comprises:
- a sodium chloride in an amount A (grams) satisfying 0.07≤A≤0.5,
- a sodium diacetate in an amount X (grams) satisfying 0.3≤X, and
- a sodium hydrogencarbonate in an amount Y (grams) satisfying Y≤0.67X.

2. A hypochlorous acid water preparation agent being an additive for preparing hypochlorous acid water by electrolyzing an electrolytic solution obtained by dissolving an electrolyte in a specified amount of water, the additive consisting of:
- sodium chloride;
- sodium diacetate; and
- sodium hydrogencarbonate,
- wherein the additive is in powder form, particle form, granule form, or tablet form, and
- the additive is added to 300 mL of water, and comprises:
  - a sodium chloride in an amount A (grams) satisfying 0.07≤A≤0.5,
  - a sodium diacetate in an amount X (grams) satisfying 0.15≤X<0.3, and
  - a sodium hydrogencarbonate in an amount Y (grams) satisfying Y≤(X−0.1).

3. A hypochlorous acid water preparation agent being an additive for preparing hypochlorous acid water by electrolyzing an electrolytic solution obtained by dissolving an electrolyte in a specified amount of water, the additive consisting of:
- sodium chloride;
- sodium diacetate; and
- sodium hydrogencarbonate,
- wherein the additive is in powder form, particle form, granule form, or tablet form, and
- the additive is added to 300 mL of water, and comprises:
  - a sodium chloride in an amount A (grams) satisfying 0.07≤A≤0.3,
  - a sodium diacetate in an amount X (grams) satisfying 0.08≤X<0.15, and
  - a sodium hydrogencarbonate in an amount Y (grams) satisfying Y≤(0.43X−0.014).

4. A hypochlorous acid water preparation agent being an additive for preparing hypochlorous acid water by electrolyzing an electrolytic solution obtained by dissolving an electrolyte in a specified amount of water, the additive consisting of:
- sodium chloride;
- sodium diacetate; and
- sodium hydrogencarbonate,
- wherein the additive is in powder form, particle form, granule form, or tablet form, and
- the additive is added to 300 mL of water, and comprises:
  - a sodium chloride in an amount A (grams) satisfying 0.07≤A≤0.5,
  - a sodium diacetate in an amount X (grams) satisfying 0.2≤X, and
  - a sodium hydrogencarbonate in an amount Y (grams) satisfying Y≤0.05.

5. A hypochlorous acid water preparation agent being an additive for preparing hypochlorous acid water being an electrolyzed solution with an electrolytic device including a diaphragmless electrolytic cell for passing an electric current of a predetermined value for a predetermined time through an aqueous solution consisting of the additive and a predetermined amount of water, the additive consisting of:
- sodium chloride; and
- sodium diacetate, wherein the additive is in powder form, particle form, granule form, or tablet form, and
the additive is added to 300 mL of water, and comprises:
- a sodium chloride in an amount A (grams) satisfying 0.07≤A≤0.5,
- a sodium diacetate in an amount X (grams) satisfying 0.08≤X, and
the hypochlorous acid water has a pH value within a range of 4.5 to 6.5.

6. A hypochlorous acid water preparation package, comprising:
- the hypochlorous acid water preparation agent according to claim 1; and
- a hermetic container storing the hypochlorous acid water preparation agent.

7. A hypochlorous acid water preparation package, comprising:
- the hypochlorous acid water preparation agent according to claim 2; and
- a hermetic container storing the hypochlorous acid water preparation agent.

8. A hypochlorous acid water preparation package, comprising:
- the hypochlorous acid water preparation agent according to claim 3; and
- a hermetic container storing the hypochlorous acid water preparation agent.

9. A hypochlorous acid water preparation package, comprising:
- the hypochlorous acid water preparation agent according to claim 4; and
- a hermetic container storing the hypochlorous acid water preparation agent.

10. A hypochlorous acid water preparation package, comprising:
- the hypochlorous acid water preparation agent according to claim 5; and
- a hermetic container storing the hypochlorous acid water preparation agent.

11. A hypochlorous acid water production method, comprising:
- adding the hypochlorous acid water preparation agent according to claim 1 to a specified amount of water to produce an electrolytic solution; and
- electrolyzing the electrolytic solution in a diaphragmless electrolytic cell to produce hypochlorous acid water.

12. A hypochlorous acid water production method, comprising:
- adding the hypochlorous acid water preparation agent according to claim 2 to a specified amount of water to produce an electrolytic solution; and
- electrolyzing the electrolytic solution in a diaphragmless electrolytic cell to produce hypochlorous acid water.

13. A hypochlorous acid water production method, comprising:
- adding the hypochlorous acid water preparation agent according to claim 3 to a specified amount of water to produce an electrolytic solution; and
- electrolyzing the electrolytic solution in a diaphragmless electrolytic cell to produce hypochlorous acid water.

14. A hypochlorous acid water production method, comprising:
- adding the hypochlorous acid water preparation agent according to claim 4 to a specified amount of water to produce an electrolytic solution; and
- electrolyzing the electrolytic solution in a diaphragmless electrolytic cell to produce hypochlorous acid water.

15. A hypochlorous acid water production method, comprising:

adding the hypochlorous acid water preparation agent according to claim 5 to a specified amount of water to produce an electrolytic solution; and electrolyzing the electrolytic solution in a diaphragmless electrolytic cell to produce hypochlorous acid water.

* * * * *